United States Patent
Zhou et al.

(10) Patent No.: US 12,069,760 B2
(45) Date of Patent: Aug. 20, 2024

(54) RESPONSE FOR TRP SPECIFIC BFRQ AND BEAM RESET

(71) Applicant: QUALCOMM Incorporated, San Diego, CA (US)

(72) Inventors: Yan Zhou, San Diego, CA (US); Kiran Venugopal, Raritan, NJ (US); Mostafa Khoshnevisan, San Diego, CA (US); Tao Luo, San Diego, CA (US); Xiaoxia Zhang, San Diego, CA (US)

( * ) Notice: Subject to any disclaimer, the term of this patent is extended or adjusted under 35 U.S.C. 154(b) by 197 days.

(21) Appl. No.: 17/448,691

(22) Filed: Sep. 23, 2021

(65) Prior Publication Data

US 2022/0104302 A1 Mar. 31, 2022

Related U.S. Application Data

(60) Provisional application No. 63/083,855, filed on Sep. 25, 2020.

(51) Int. Cl.
| | |
|---|---|
| H04W 76/19 | (2018.01) |
| H04L 1/1607 | (2023.01) |
| H04L 1/1812 | (2023.01) |
| H04W 24/04 | (2009.01) |
| H04W 72/21 | (2023.01) |
| H04W 72/23 | (2023.01) |
| H04W 74/04 | (2009.01) |

(52) U.S. Cl.
CPC ........... *H04W 76/19* (2018.02); *H04L 1/1607* (2013.01); *H04L 1/1812* (2013.01); *H04W 24/04* (2013.01); *H04W 72/21* (2023.01); *H04W 72/23* (2023.01); *H04W 74/04* (2013.01)

(58) Field of Classification Search
None
See application file for complete search history.

(56) References Cited

U.S. PATENT DOCUMENTS

| | | | | |
|---|---|---|---|---|
| 2018/0302889 | A1* | 10/2018 | Guo | H04L 5/0085 |
| 2020/0267048 | A1* | 8/2020 | Yu | H04B 7/0695 |
| 2021/0022158 | A1* | 1/2021 | Wei | H04L 5/0092 |
| 2021/0037590 | A1* | 2/2021 | Yang | H04W 76/18 |
| 2021/0320710 | A1* | 10/2021 | Koskela | H04B 17/309 |

(Continued)

FOREIGN PATENT DOCUMENTS

KR 1020200064358 * 1/2021

OTHER PUBLICATIONS

Author Unknown, On beam recovery for partial and full control channel failure, pp. 1-7, Sep. 21, 2017.*

(Continued)

*Primary Examiner* — Christopher M Crutchfield

(57) ABSTRACT

Certain aspects of the present disclosure provide enhancements to enable per transmission reception point (per-TRP or per beam group) based beam failure recovery (BFR), and more particularly, techniques for configuring physical uplink control channel (PUCCH) BFR for TRP specific BFR. A method that may be performed by a user equipment (UE) includes communicating using beams associated with at least two beam groups, transmitting a beam failure recovery request (BFRQ) specific to a first beam group of the at least two beam groups based on a detected beam failure in the first beam group, and receiving a response to the BFRQ based, at least in part, on how the BFRQ is transmitted.

30 Claims, 15 Drawing Sheets

(56) References Cited

U.S. PATENT DOCUMENTS

2022/0345284 A1* 10/2022 Kim .................... H04L 5/0053
2023/0006727 A1* 1/2023 Jang .................... H04L 5/0051

OTHER PUBLICATIONS

Author Unknown, Discussion on beam failure recovery for SCell, pp. 1-3, Oct. 12, 2018.*
Author Unknown, Discussion on Beam Recovery Mechanism, pp. 1-6, Sep. 21, 2017.*

* cited by examiner

Pattern 1

Scell BFR MAC CE with the highest *ServCellIndex* of this MAC entity's Scell configured with BFD is less than 8 (up to 7 cells)

Scell BFR MAC CE with the highest *ServCellIndex* of this MAC entity's Scell configured with BFD is equal to or larger than 8

RESPONSE FOR TRP SPECIFIC BFRQ AND BEAM RESET

CROSS-REFERENCE TO RELATED APPLICATION(S)

This application claims benefit of and priority to U.S. Provisional Application No. 63/083,855, filed Sep. 25, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to beam failure recovery (BFR).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved techniques for transmission reception point (TRP)/beam group specific beam failure recovery (BFR).

Certain aspects of the disclosure are directed to a method of wireless communication by a user equipment (UE). In some examples, the method includes communicating using beams associated with at least two beam groups. In some examples, the method includes transmitting a beam failure recovery request (BFRQ) specific to a first beam group of the at least two beam groups based on a detected beam failure in the first beam group. In some examples, the method includes receiving a response to the BFRQ based, at least in part, on how the BFRQ is transmitted.

Certain aspects of the disclosure are directed to a method of wireless communication by a transmission reception point (TRP). In some examples, the method includes receiving, from a user equipment (UE), a beam failure recovery request (BFRQ) specific to a beam group in which the beam failure was detected. In some examples, the method includes transmitting a response to the BFRQ based, at least in part, on how the BFRQ is received.

Certain aspects of the disclosure are directed to a user equipment (UE) configured for wireless communication. The UE includes a memory and a processor coupled to the memory. In some examples, the processor and the memory are configured to communicate using beams associated with at least two beam groups. In some examples, the processor and the memory are configured to transmit a beam failure recovery request (BFRQ) specific to a first beam group of the at least two beam groups based on a detected beam failure in the first beam group. In some examples, the processor and the memory are configured to receive a response to the BFRQ based, at least in part, on how the BFRQ is transmitted.

Certain aspects of the disclosure are directed to a transmission reception point (TRP) for wireless communication. The TRP includes a memory and a processor coupled to the memory. In some examples, the processor and the memory are configured to receive, from a user equipment (UE), a beam failure recovery request (BFRQ) specific to a beam group in which the beam failure was detected. In some examples, the processor and the memory are configured to transmit a response to the BFRQ based, at least in part, on how the BFRQ is received.

Certain aspects of the disclosure are directed to a user equipment (UE). In some examples, the UE includes means for communicating using beams associated with at least two beam groups. In some examples, the method includes transmitting a beam failure recovery request (BFRQ) specific to a first beam group of the at least two beam groups based on a detected beam failure in the first beam group. In some examples, the UE includes means for receiving a response to the BFRQ based, at least in part, on how the BFRQ is transmitted.

Certain aspects of the disclosure are directed to a transmission reception point (TRP). In some examples, the TRP includes means for receiving, from a user equipment (UE), a beam failure recovery request (BFRQ) specific to a beam group in which the beam failure was detected. In some examples, the TRP includes means for transmitting a response to the BFRQ based, at least in part, on how the BFRQ is received.

Certain aspects of the disclosure are directed to a non-transitory computer-readable medium having instructions stored thereon that, when executed by a UE, cause the UE to perform operations. In some examples, the operations include communicating using beams associated with at least two beam groups. In some examples, the operations include transmitting a beam failure recovery request (BFRQ) specific to a first beam group of the at least two beam groups based on a detected beam failure in the first beam group. In some examples, the operations include receiving a response to the BFRQ based, at least in part, on how the BFRQ is transmitted.

Certain aspects of the disclosure are directed to a non-transitory computer-readable medium having instructions stored thereon that, when executed by a TRP, cause the TRP to perform operations. In some examples, the operations include receiving, from a user equipment (UE), a beam failure recovery request (BFRQ) specific to a beam group in which the beam failure was detected. In some examples, the operations include transmitting a response to the BFRQ based, at least in part, on how the BFRQ is received.

Certain aspects of the subject matter described in this disclosure can be implemented in a method for wireless communication by a UE. The method generally includes communicating with at least two transmission reception points (TRPs) using beams associated with at least two beam groups, each associate with one of the TRPs, detecting a beam failure in a first one of the beam groups, transmitting a beam failure recovery request (BFRQ) specific to a beam group in which the beam failure was detected, and monitoring for a response to the BFRQ based, at least in part, on how the BFRQ is transmitted.

Certain aspects of the subject matter described in this disclosure can be implemented in a method for wireless communication by a network entity. The method generally includes receiving, from a user equipment, a beam failure recovery request (BFRQ) specific to a beam group in which the beam failure was detected and sending a response to the BFRQ based, at least in part, on how the BFRQ is received.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
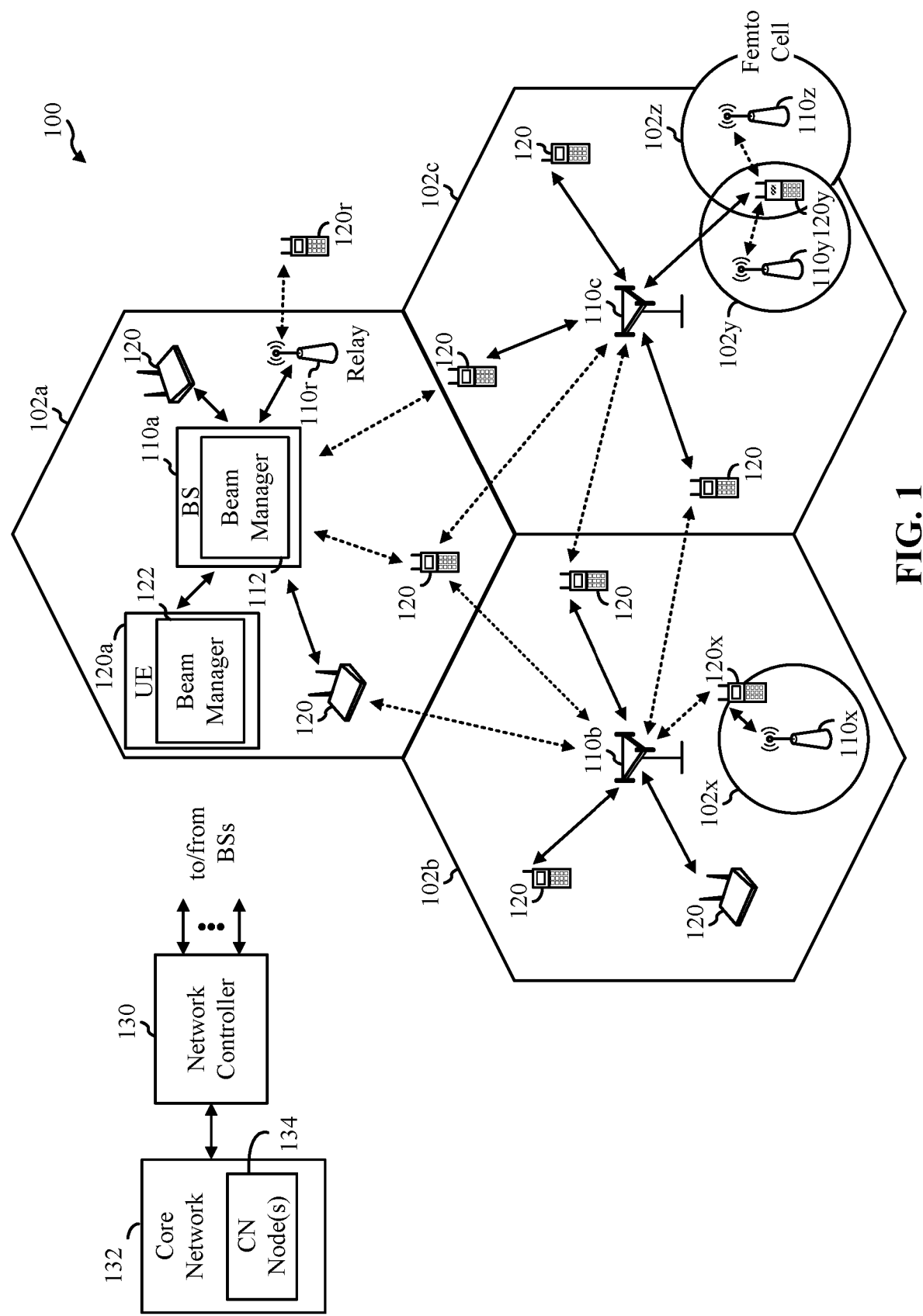
FIG. 1 is a block diagram conceptually illustrating an example telecommunications system, according to aspects of the present disclosure.

Aspects of the present disclosure provide apparatus, methods, processing systems, and computer readable mediums for techniques enabling per-transmission reception point (per-TRP) or per beam group based beam failure recovery (BFR) procedures. More specifically, the techniques may involve the configuration of physical uplink control channel (PUCCH) beam failure recovery (BFR) for transmission reception point (TRP) specific BFR. While the techniques may involve beam groups, they may be considered TRP-specific. This is because the concept of TRPs may generally be kept transparent to a UE. In other words, the UE may only be aware of a beam group (for a set of beams) corresponding to a TRP (but may be unaware of the actual corresponding TRP ID). Thus, certain aspects are directed to providing the UE with an indication that a beam failure recovery request (BFRQ) for a particular beam group is successful and, hence, the UE may stop further BFRQ attempts for that beam group. Such signaling may enhance wireless communication by reducing unnecessary transmissions, thereby preserving air interface resources and processing resources. In certain aspects, a TRP may itself be a base station (BS), or each TRP may be a radio head (RH) for a base station, where a BS may have multiple RHs.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G new radio (NR)) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. Multiple-input multiple-output (MIMO) transmissions with precoding may also be supported. MIMO configurations in a downlink may support up to 8 transmit antennas with multi-layer downlink transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may include a UE 120$a$ (with a beam manager 122) that is configured to perform operations 1200 of FIG. 12 and operations 1600 of FIG. 16. Similarly, the wireless communication network 100 may include a network entity, such as base station (BS) 110$a$ (with a beam manager 112) that is configured to perform operations 1300 of FIG. 13.

As shown in FIG. 1, the wireless communication network 100 may be in communication with a core network (CN) 132, including one or more CN nodes 134. The core network 132 may in communication with one or more base station (BSs) 110$a$-$z$ (each also individually referred to herein as BS 110 or collectively as BSs 110) and/or user equipment (UE) 120$a$-$y$ (each also individually referred to herein as UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110$a$, 110$b$ and 110$c$ may be macro BSs for the macro cells 102$a$, 102$b$ and 102$c$, respectively. The BS 110$x$ may be a pico BS for a pico cell 102$x$. The BSs 110$y$ and 110$z$ may be femto BSs for the femto cells 102$y$ and 102$z$, respectively. A BS may support one or multiple cells.

The BSs 110 communicate with UEs 120 in the wireless communication network 100. The UEs 120 (e.g., 120$x$, 120$y$, etc.) may be dispersed throughout the wireless communication network 100, and each UE 120 may be stationary or mobile. Wireless communication network 100 may also include relay stations (e.g., relay station 110$r$), also referred to as relays or the like, that receive a transmission of data and/or other information from an upstream station (e.g., a BS 110$a$ or a UE 120$r$) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
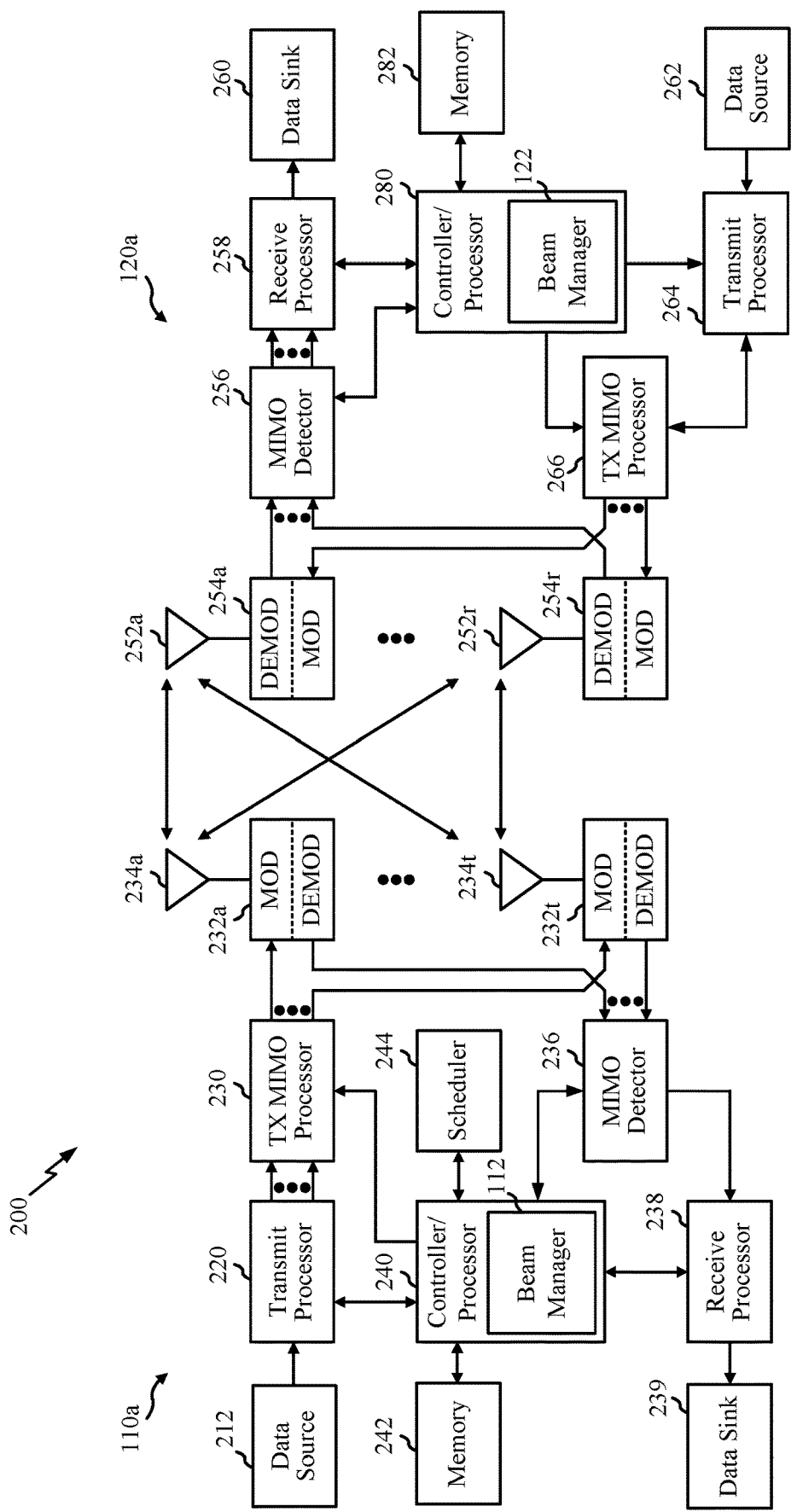
FIG. 2 is a block diagram conceptually illustrating a design of an example base station (BS) and a user equipment (UE), according to aspects of the present disclosure.

FIG. 2 illustrates example components of a BS 110$a$ and a UE 120$a$ (e.g., in the wireless communication network 100 of FIG. 1).

At the BS 110$a$, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a beam manager 112 that configures PUCCH-BFR for TRP specific (or beam group specific) BFR, according to aspects described herein. As shown in FIG. 2, the controller/processor 280 of the UE 120a has a beam manager 122 that configures PUCCH-BFR for TRP specific (or beam group specific) BFR, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
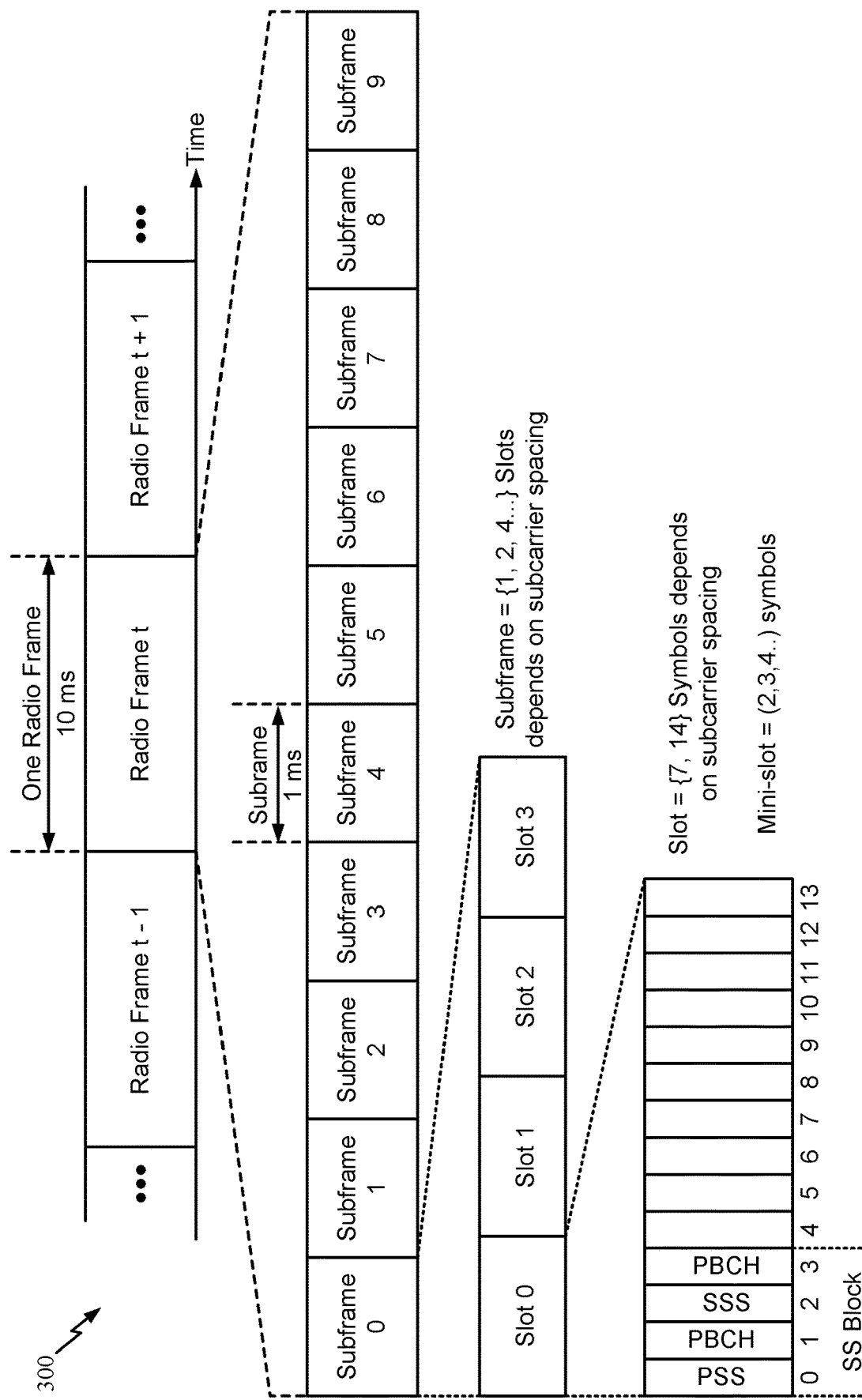
FIG. 3 is an example frame format for new radio (NR), according to aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Further system information such as, remaining minimum system information (RMSI), system information blocks (SIBs), other system information (OSI) can be transmitted on a physical downlink shared channel (PDSCH) in certain subframes.

Figure 4:
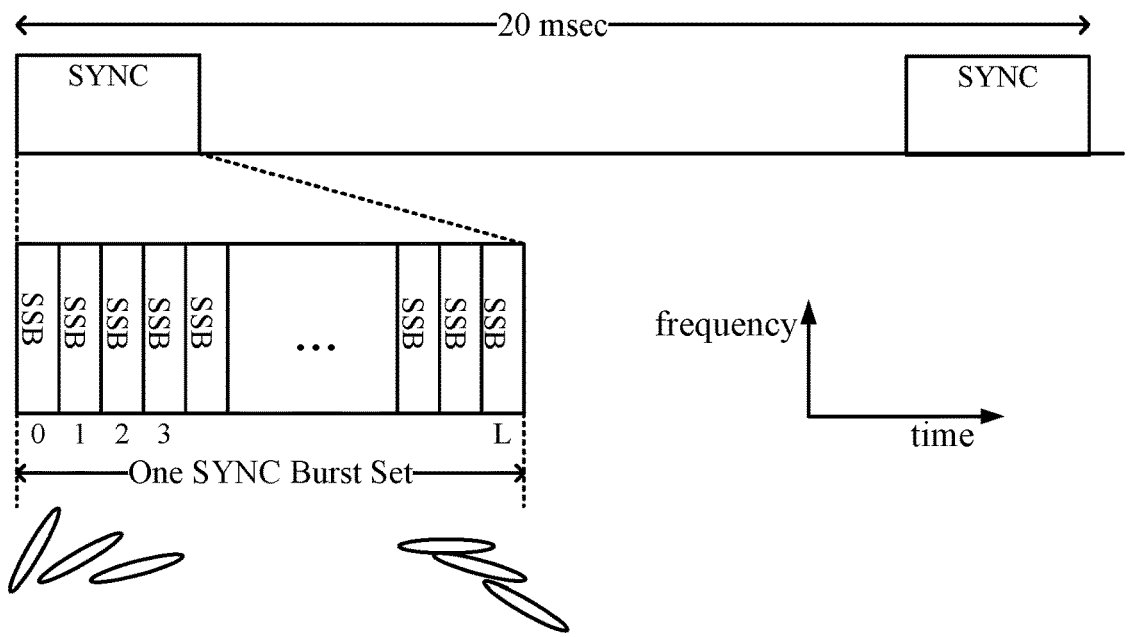
FIG. 4 illustrates how different synchronization signal blocks (SSBs) may be sent using different beams, according to aspects of the present disclosure.

As shown in FIG. 4, the SS blocks may be organized into SS burst sets to support beam sweeping. As shown, each SSB within a burst set may be transmitted using a different beam, which may help a UE quickly acquire both transmit (Tx) and receive (Rx) beams (e.g., in certain mmW applications). A physical cell identity (PCI) may still be decoded from the PSS and SSS of the SSB.

Certain deployment scenarios may include one or both NR deployment options. Some may be configured for non-standalone (NSA) and/or standalone (SA) option. A standalone cell may need to broadcast both SSB and remaining minimum system information (RMSI), for example, with SIB1 and SIB2. A non-standalone cell may only need to broadcast SSB, without broadcasting RMSI. In a single carrier in NR, multiple SSBs may be sent in different frequencies, and may include the different types of SSB.

Control Resource Sets (CORESETs)

A control resource set (CORESET) for an OFDMA system (e.g., a communications system transmitting PDCCH using OFDMA waveforms) may comprise one or more control resource (e.g., time and frequency resources) sets, configured for conveying PDCCH, within the system bandwidth (e.g., a specific area on the NR downlink resource grid) and a set of parameters used to carry PDCCH/DCI. For example, a CORESET may be similar in area to an LTE PDCCH area (e.g., the first 4 OFDM symbols in a subframe).

Within each CORESET, one or more search spaces (e.g., common search space (CSS), UE-specific search space (USS), etc.) may be defined for a given UE. Search spaces are generally areas or portions where a communication device (e.g., a UE) may look for control information.

According to aspects of the present disclosure, a CORESET is a set of time and frequency domain resources, defined in units of resource element groups (REGs). Each REG may comprise a fixed number (e.g., twelve) tones/subcarriers in one symbol period (e.g., a symbol period of a slot), where one tone in one symbol period is referred to as a resource element (RE). A fixed number of REGs, such as six, may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE. The UE may receive the NR-PDCCH by searching in search spaces for the UE and decoding the NR-PDCCH transmitted by the NodeB.

As noted above, different aggregation levels may be used to transmit sets of CCEs. Aggregation levels may be generally defined as the number of CCEs that include a PDCCH candidate and may include aggregation levels 1, 2, 4, 8, and 18, which may be configured by a radio resource control (RRC) configuration of a search space set (SS-set). A CORESET may be linked with the SS-set within the RRC configuration. For each aggregation level, the number of PDCCH candidates may be RRC configurable.

Operating characteristics of a NodeB or other base station in an NR communications system may be dependent on a frequency range (FR) in which the system operates. A frequency range may comprise one or more operating bands (e.g., "n1" band, "n2" band, "n7" band, and "n41" band), and a communications system (e.g., one or more NodeBs and UEs) may operate in one or more operating bands. Frequency ranges and operating bands are described in more detail in "Base Station (BS) radio transmission and reception" TS38.104 (Release 15), which is available from the 3GPP website.

As described above, a CORESET is a set of time and frequency domain resources. The CORESET can be configured for conveying PDCCH within system bandwidth. A UE may determine a CORESET and monitor the CORESET for control channels. During initial access, a UE may identify an initial CORESET (CORESET #0) configuration from a field (e.g., pdcchConfigSIB1) in a maser information block (MIB). This initial CORESET may then be used to configure the UE, such as with other CORESETs and/or bandwidth parts via dedicated (e.g., UE-specific) signaling. When the UE detects a control channel in the CORESET, the UE attempts to decode the control channel and communicates with the transmitting BS (e.g., the transmitting cell) according to the control data provided in the control channel (e.g., transmitted via the CORESET).

In some cases, CORESET #0 may include different numbers of resource blocks (RBs). For example, in some cases, CORESET #0 may include one of 24, 48, or 96 RBs. For other CORESETSs, a 45-bit bitmap may be used to configure available RB-groups, where each bit in the bitmap is with respect to 6-RBs within a bandwidth part (BWP) and a most significant bit corresponds to the first RB-group in the BWP.

According to aspects of the present disclosure, when a UE is connected to a cell (or BS), the UE may receive a master information block (MIB). The MIB can be in a synchronization signal and physical broadcast channel (SS/PBCH) block (e.g., in the PBCH of the SS/PBCH block) on a synchronization raster (sync raster). In some scenarios, the sync raster may correspond to an SSB. From the frequency of the sync raster, the UE may determine an operating band of the cell. Based on a cell's operation band, the UE may determine a minimum channel bandwidth and a subcarrier spacing (SCS) of the channel. The UE may then determine an index from the MIB (e.g., four bits in the MIB, conveying an index in a range 0-15).

Given this index, the UE may look up or locate a CORESET configuration (this initial CORESET configured via the MIB is generally referred to as CORESET #0). This may be accomplished from one or more tables of CORESET configurations. These configurations (including single table scenarios) may include various subsets of indices indicating valid CORESET configurations for various combinations of minimum channel bandwidth and subcarrier spacing (SCS). In some arrangements, each combination of minimum channel bandwidth and SCS may be mapped to a subset of indices in the table.

Alternatively, or additionally, the UE may select a search space CORESET configuration table from several tables of CORESET configurations. These configurations can be based on a minimum channel bandwidth and SCS. The UE may then look up a CORESET configuration (e.g., a Type0-PDCCH search space CORESET configuration) from the selected table, based on the index. After determining the CORESET configuration (e.g., from the single table or the selected table), the UE may then determine the CORESET to be monitored (as mentioned above) based on the location (in time and frequency) of the SS/PBCH block and the CORESET configuration.

Figure 5:
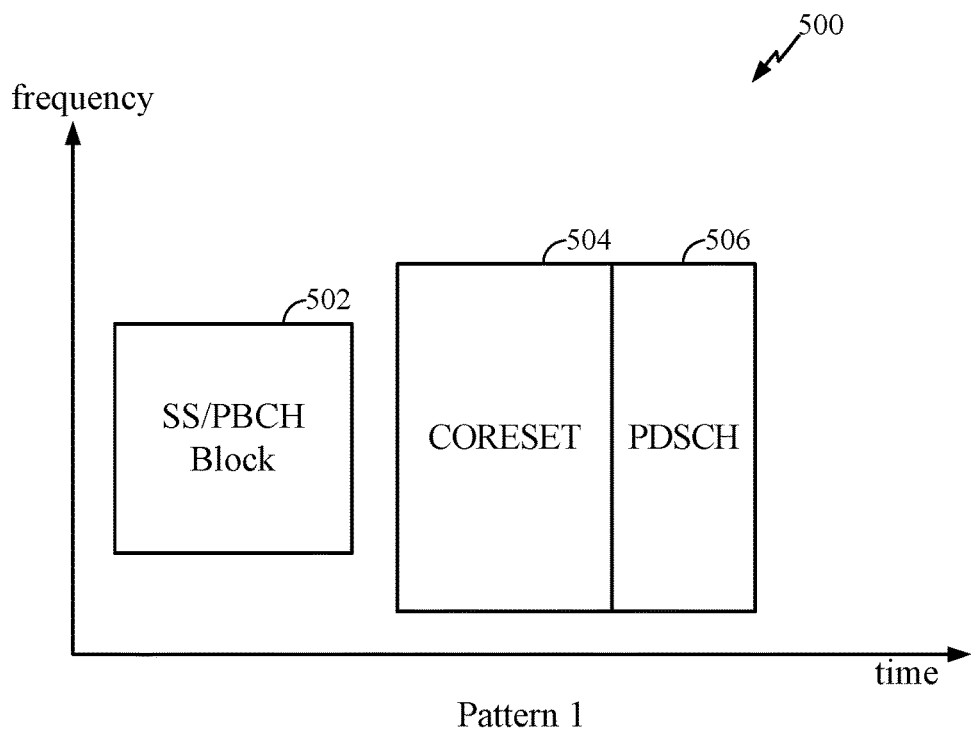
FIG. 5 illustrates an exemplary transmission resource mapping, according to aspects of the present disclosure.

FIG. 5 shows an exemplary transmission resource mapping 500, according to aspects of the present disclosure. In the exemplary mapping, a BS (e.g., BS 110a, shown in FIG. 1) transmits an SS/PBCH block 502. The SS/PBCH block includes a MIB conveying an index to a table that relates the time and frequency resources of the CORESET 504 to the time and frequency resources of the SS/PBCH block.

The BS may also transmit control signaling. In some scenarios, the BS may also transmit a PDCCH to a UE (e.g., UE 120, shown in FIG. 1) in the (time/frequency resources of the) CORESET. The PDCCH may schedule a PDSCH 506. The BS then transmits the PDSCH to the UE. The UE may receive the MIB in the SS/PBCH block, determine the index, look up a CORESET configuration based on the index, and determine the CORESET from the CORESET configuration and the SS/PBCH block. The UE may then monitor the CORESET, decode the PDCCH in the CORESET, and receive the PDSCH that was allocated by the PDCCH.

Different CORESET configurations may have different parameters that define a corresponding CORESET. For example, each configuration may indicate a number of resource blocks (e.g., 24, 48, or 96), a number of symbols (e.g., 1-3), and/or an offset (e.g., 0-38 RBs) that indicates a location in frequency.

Further, REG bundles may be used to convey CORESETs. REGs in an REG bundle may be contiguous in a frequency and/or a time domain. In certain cases, the time domain may be prioritized before the frequency domain. REG bundle sizes may include, for example: 2, 3, or 6 for interleaved mapping and 6 for non-interleaved mapping.

As noted above, sets of CCEs may be used to transmit new radio PDCCHs (NR-PDCCHs), with different numbers of CCEs in the sets used to transmit NR-PDCCHs using differing aggregation levels.

Example Multi-TRP Beam Failure Recovery (BFR)

As mentioned above, aspects of the present disclosure relate generally to beam failure detection and recovery. In some systems, narrow-beam transmission and reception is useful for improving the link budget at millimeter-wave (mmW) frequencies but may be susceptible to beam failure. In mmW, directional beamforming is used between the UE and a BS, and the UE and BS communicate via a beam pair link (BPL). Though certain aspects may be described with respect to mmW frequency, such aspects may also be applicable to other suitable frequencies.

A beam failure generally refers to a scenario in which the quality of a beam falls below a threshold, which may lead to radio link failure (RLF). In response to RLF, a UE may perform a cell reselection process, wherein the UE may use neighbor BS information acquired from a decoded neighbor advertisement message, or may schedule scanning/sleep intervals to scan for neighbor base stations for the purpose of handover to a potential target BS. To avoid cell reselection, the UE may use a faster procedure using lower layer signaling within the same cell to recover from beam failure, referred to as beam recovery. For example, instead of initiating a cell reselection when a beam pair link quality becomes too low, a beam pair reselection within the same cell can be performed. Relatively speaking, beam pair reselection requires less time and fewer processing resources compared to cell reselection.

Beam failure may be detected by monitoring a beam failure detection (BFD) reference signal (RS) and assessing if a beam failure trigger condition has been met. Generally, a UE monitors the BFD RS from a primary cell (Pcell), a primary secondary cell (PScell), or a secondary cell (Scell) (e.g., coverage area of a BS). In some examples, beam failure detection is triggered if an estimated block error rate (BLER) of reference signals associated with a configured control resource set (CORESET) is above a threshold (e.g., 10%). In some examples, the UE detects beam failure when the reference signal receive power (RSRP) or other signal quality measurement (based on the BFD RS) of a BPL fails to satisfy (e.g., is below) a threshold. Once beam failure is detected, the UE initiates beam failure recovery (BFR).

In some examples, a BFR procedure may include candidate beam detection (CBD), whereby a UE may detect and measure candidate beams within a cell for beam recovery. Through CBD measurements, a UE can report a good beam to a TRP upon detection of a beam failure. In a multi-TRP scenario, for BFR, the UE may be configured to provide per-TRP BFR, which enables separate BFD and separate CBD for the beams corresponding to a TRP in a component carrier (CC) that is configured with two values of CORESET pool indices. For example, the TRP may employ carrier aggregation (CA) to provide sufficient bandwidth to support high data rate communications. Such a CA system may combine bandwidth from distinct frequency bands, with each referred to as a CC. In some examples, the UE and TRP may use multiple CCs, each of which may be scheduled independent of the others. For example, a separate CC may be used for downlink control information (DCI), downlink data, uplink control information (UCI), and uplink data, and each may be scheduled independent of the others.

In the absence of per-TRP BFR, BFD and CBD may not be triggered until all beams in that CC become weak. With per-TRP BFR, when beams for a given TRP become weak, beam recovery procedures can be performed and a suitable (e.g., best, a beam above a threshold, etc.) beam corresponding to that TRP can be identified without having to wait for the beams of the other TRP to also become weak, and thus reliability and communications efficiency can be enhanced.

Figure 6:
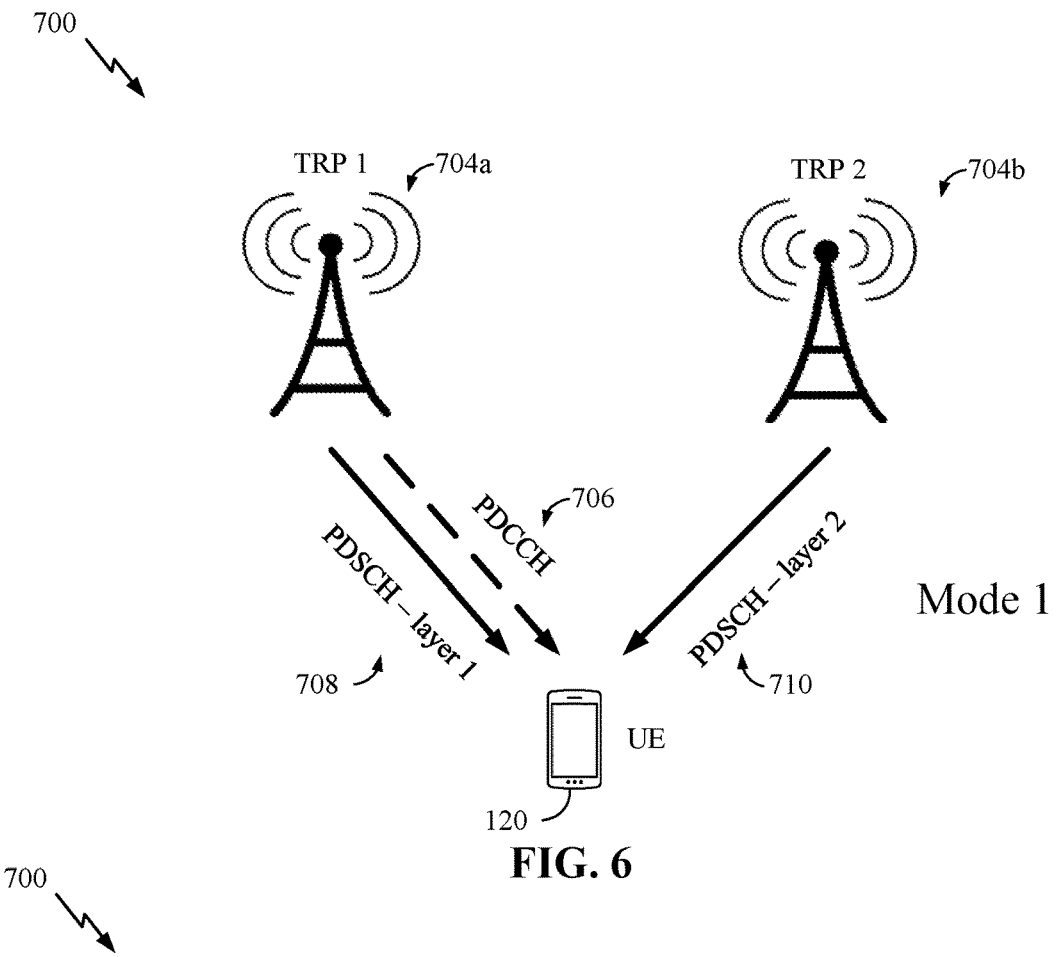
FIGS. 6 and 7 illustrate examples of multi-transmission reception point (multi-TRP) systems, in which aspects of the present disclosure may be practiced.
Figure 7:
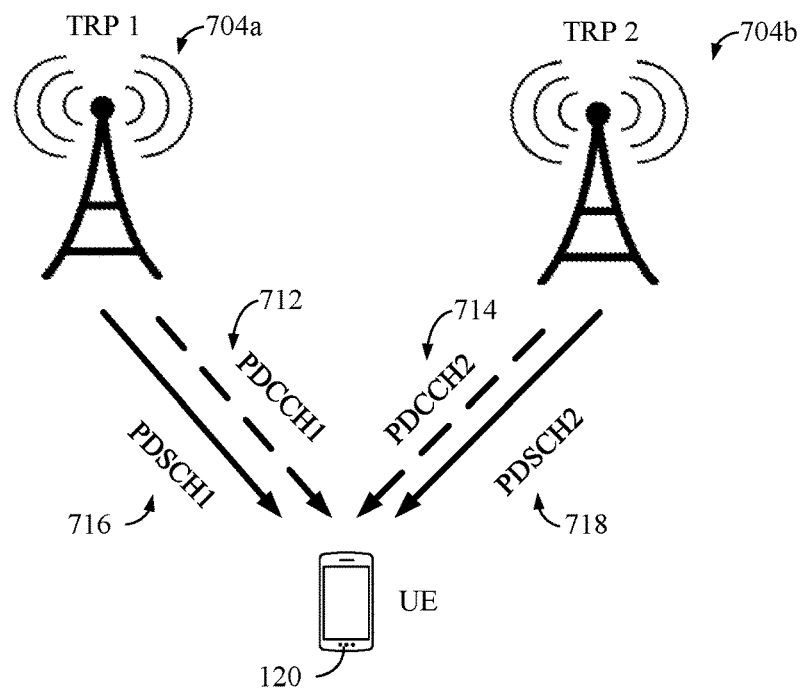

FIGS. 6 and 7 illustrate examples of a wireless communication system 700 that supports BFR for a multi-TRP in a PCell, PScell, or Scell, in accordance with aspects of the present disclosure.

In some examples, a multi-TRP operation wireless communication system 700 may include a UE 120, and a number of TRPs 704a-b associated with PCell/PScell/Scell, which may be examples of the corresponding devices described herein. TRPs 704a-b may, in this example, provide a multi-TRP PCell/PScell/Scell in which a first beam of a first TRP 704a and a second beam of a second TRP 704b provide communications with the UE 120.

As shown in FIG. 6, in some examples, the multi-TRP transmissions may be configured based on a single downlink control information (DCI) communication, in which the DCI (e.g., transmitted in physical downlink control channel (PDCCH) 706 from first TRP 704a) schedules a downlink shared channel transmission; PDSCH—layer 1 708 transmitted from first TRP 704a via the first beam and PDSCH—layer 2 710 transmitted from second TRP 704b via the second beam. Configuration based on a single DCI communication may allow different TRPs (e.g., first TRP 704a and second TRP 704b) to transmit different spatial layers in overlapping resource blocks (RBs)/symbols. In some examples, different TRPs 704 may transmit different resource blocks multiplexed on a downlink carrier using frequency division multiplexing (FDM) techniques or different orthogonal frequency division multiplexing (OFDM) symbols multiplexed on a downlink carrier using time division multiplexing (TDM) techniques. Multi-TRP operation configured based on a single DCI communication may result in ideal backhaul or backhaul with a small delay.

As shown in FIG. 7, in some examples, the multi-TRP transmissions may be configured based on multiple downlink control information (DCI) communications, in which a first DCI (e.g., transmitted in PDCCH1 712 from first TRP 704a) schedules a downlink shared channel transmission (e.g., PDSCH1 716 transmitted from first TRP 704a via the first beam), and a second DCI (e.g., transmitted in PDCCH2 714 from second TRP 704b) schedules a second downlink shared channel transmission (e.g., PDSCH2 718 transmitted from second TRP 704b via the second beam). In some examples, one or more of the first TRP 704a or the second TRP 704b may transmit a CORESET configuration indicating different values of a "CORESETPoolIndex" parameter, providing the UE 102 with different CORESET groups/multiple CORESET groups. In some examples, the CORESETPoolIndex parameter may be different for each TRP 704. Thus, TRP 704 differentiation at the UE 120, in some cases, may be based on a value of the CORESET pool index, where each CORESET (e.g., up to a maximum of five CORESETs) can be configured with a value of CORESET pool index. To support multiple PDCCH monitoring as shown in FIG. 7, for example, up to a maximum of five CORESETs can be configured with up to three CORESETs per TRP.

Figure 8:
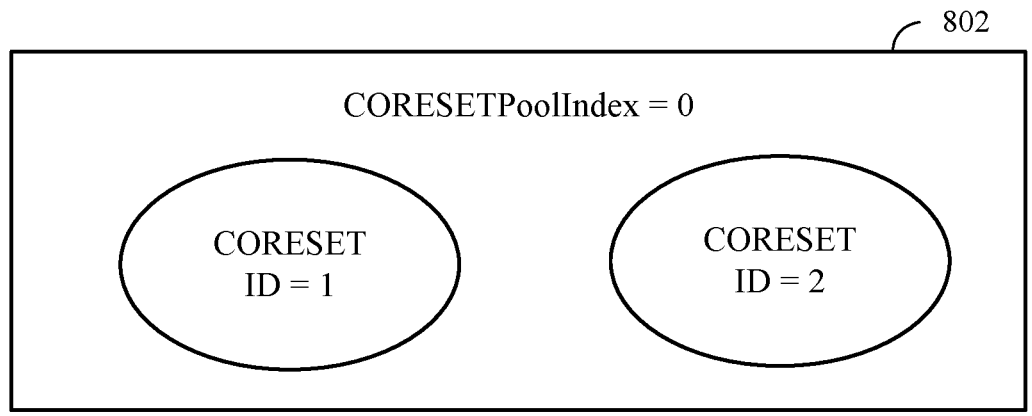
FIG. 8 illustrates example control resource set (CORESET) groups.
Figure 8:
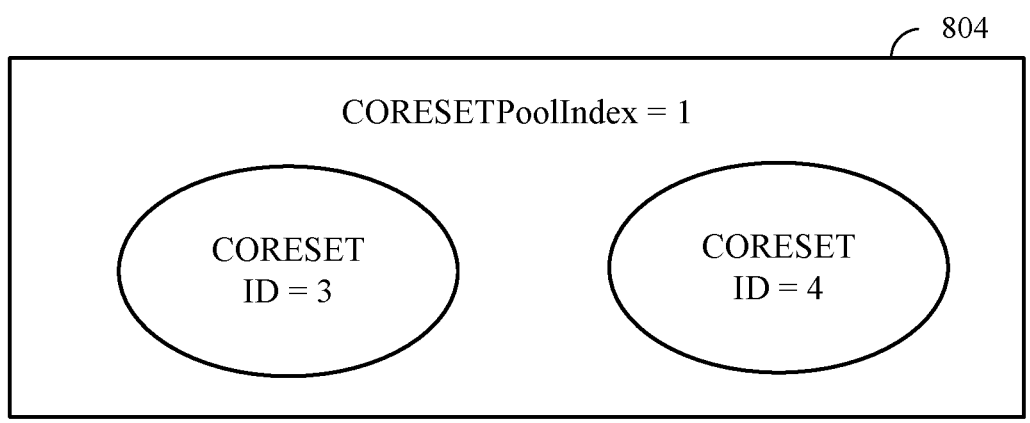

As shown in FIG. 8, in some examples, the UE may be configured by a higher layer parameter PDCCH-Config (e.g., a condition in 3GPP specification used to determine whether UE 120 is configured with multi-DCI based multi-TRP) which contains two different values of CORESET-PoolIndex in CORESETs for the active bandwidth part (BWP) of a serving cell. In some examples, the value of CORESET pool index may be zero (0) 802 or one (1) 804, which groups the CORESETs into two groups, which may correspond to the different TRPs 704. Beyond the CORESET pool index distinction, the UE 120 is oblivious to differences beyond identifying that different TRPs are used within the wireless communication system. Only some CCs may be configured with two values of CORESET pool index, while other CCs may not be configured with two values of CORESET pool index and thus BFD/BFR for on a per-TRP 704 basis may be provided for CCs that are configured with two values of CORESET pool index.

In the non-limiting example shown in FIG. 7, PCell/PSCell/SCell may be configured with two values of CORESET pool index, with one value associated with the first TRP 704a and a second value associated with second TRP 704b. In this case, each TRP 704 may transmit one or more BFD reference signals that may be monitored by the UE 120. In this example, the UE 120 may determine that a first beam of a first CORESET pool index value (e.g., CORESETPoolIndex=0) has a channel metric (e.g., a reference signal received power RSRP)) that is below a threshold value (e.g., when radio link quality is worse than a threshold (e.g., Qout) for all the reference signals in BFD resources that are associated with the first CORESET pool index value). In this example, Qout may be defined as a level at which the downlink radio level link of a given resource configuration cannot be reliably received.

Accordingly, a UE may be configured for a carrier (e.g., an individual CC, bandwidth part (BWP), and the like) associated with Pcell/Pscell/Scell that is configured with the first CORESET pool index value (e.g., CORESETPoolIndex=0) and a second CORESET pool index value (e.g., CORESETPoolIndex=1). The first CORESET pool index value may be associated with the first TRP 704a of Pcell/Pscell/Scell and the second CORESET pool index value may be associated with the second TRP 704b of Pcell/Pscell/Scell. Each TRP 704 may transmit one or more BFD reference signals that are associated with their respective value of CORESET pool index. This may include two sets of BFD reference signals (e.g., failureDetectionResources) being configured, with each set corresponding to a different value of CORESET pool index. In another example this may include each reference signal (e.g., each resource within failureDetectionResources) being configured with a CORESET pool index value. If the resource is not configured with a CORESET pool index value, it may be considered associated with CORESET pool index value 0 (e.g., the first CORESET pool index value). Additionally, a resource may be configured with both values of CORESET pool indices. When the reference signals (e.g., failureDetectionResources) are not configured, the reference signal sets indicated in the active transmission configuration indicator (TCI) states of CORESETS configured with CORESET pool index value=0/1 (e.g., either CORESET pool index value) may determine the first/second set of resources, respectively. BFD for a value of CORESET pool index may be declared when the radio link quality is worse than Qout for all the reference signals and the BFD resources that are associated with that CORESET pool index value.

UE 120 may also receive or otherwise identify an indication of a set of candidate beams available for a BFR procedure. The set of candidate beams may include a first subset of candidate beams associated with the first CORESET pool index value and a second subset of candidate beams associated with the second CORESET pool index value. In one example, this may include two lists of candidate beams (e.g., candidateBeamRSList) being configured, each corresponding to a CORESET pool index value. In this example, each candidateBeamRSList may include a list of reference signals (e.g., CSI-RS, SSB, etc.) identifying the candidate beams for recovery and any associated random access parameters. That is, UE 120 may be separately configured with the first subset of candidate beams associated with the first CORESET pool index value and the second subset of candidate beams associated with the second CORESET pool index value.

UE 120 may detect or otherwise determine that a beam failure has occurred (e.g., the RSRP on the active beam is less than Qout) on the carrier of the active beam (e.g., either the first beam or the second beam) of Pcell/Pscell/Scell. UE 120 may, based on the detected beam failure, select a new candidate beam from the set of candidate beams based on monitoring a resource (e.g., CBD resources) associated with the first CORESET pool index value or the second CORESET pool index value. When BFD is declared for a value of CORESET pool index, a new candidate beam (e.g., identified by reference signal index/ID "Qnew") may be identified from within the candidate reference signals associated with the same value of CORESET pool index. Accordingly, UE 120 may select a new candidate beam from the set of candidate beams based on monitoring a resource (e.g., CBD resource(s)) associated with the first CORESET pool index value when the first beam experiences beam failure or the second CORESET pool index value when the second beam experiences beam failure. UE 120 may transmit or otherwise convey an access message to Pcell/Pscell/Scell (e.g., via the first TRP 704*a* if the conditions on the carrier permit and/or via the second TRP 704*b*) indicating the new candidate beam during the BFR procedure.

In some aspects, UE 120 may receive or otherwise identify a first subset of random access resources (e.g., RACH resources/random access preamble indices) associated with the first subset of candidate beam detection (e.g., CBD) resources corresponding to the first subset of candidate beams and a second subset of random access resources associated with a second subset of CBD resources corresponding to the second subset of candidate beams. That is, dedicated RACH resources for BFR may also be associated with the value of the CORESET pool index. In some examples, this may include an implicit indication based on an association of a RACH resource/random access preamble index with a candidate beam reference signal (e.g., as each candidate beam reference signal is already associated with a value of a CORESET pool index). The network (e.g., Pcell/Pscell/Scell) may determine which TRP/CORESET pool index value has experienced a beam failure in the Pcell/Pscell/Scell based on the resource/random access preamble index of the received RACH (e.g., based on the random access resource used for transmitting the access message).

In some examples this may include two lists of RACH resources/random access preamble indices being configured, with each list of RACH resource/random access preamble index being associated with one of the CORESET pool index values. For example, UE 120 may receive an indication of a first set of random access resources associated with the first CORESET pool index value and a second set of random access resources associated with the second CORESET pool index value. Accordingly, UE 120 may determine that the new candidate beam is associated with the first subset of candidate beams and select a random access resource from the first set of random access resources corresponding to the new candidate beam to transmit the access message. In another example, UE 120 may determine that the new candidate beam is associated with the second subset of candidate beams and select a random access resource from the second set of random access resources corresponding to the new candidate beam to transmit the access message.

UE 120 may transmit or otherwise convey the access message utilizing the corresponding RACH resources/random access preamble to carry or otherwise convey an indication of the CORESET pool index value associated with the beam failure. UE 120 may reset the active beam associated with the TRP 704 experiencing the beam failure.

In some examples, this may include updating various quasi-colocation (QCL) relationships. For example, two antenna ports are said to be QCL'd if properties of a channel over which a first symbol on one antenna port is conveyed can be inferred from another channel over which a second symbol on another antenna port is conveyed. That is, if the first symbol is QCL'd with the second symbol, then channel information estimated to detect the second symbol may be used to detect the first symbol as well.

For example, UE 120 may determine that the new candidate beam is associated with the first CORESET pool index value and, therefore, update the QCL relationship for a CORESET with index 0 (e.g., the CORESET that is used for common search space procedures). The updated QCL relationship may correspond to the QCL configuration of the new candidate beam. That is, when the new candidate beam (e.g., corresponding to reference signal index Qnew) corresponds to CORESET pool index value 0, the QCL assumptions for CORESET 0 may be updated (e.g., after 28 symbols after the last symbol carrying PDCCH). Accordingly, the updated QCL configuration may occur after a threshold time period. The QCL assumption (e.g., QCL configuration) for CORESET 0 may not be updated when the new candidate beam corresponds to CORESET pool index value 1 (e.g., the second CORESET pool index value). In some examples, this may be based on CORESET 0 being typically associated with CORESET pool index value 0.

In some examples, this may include UE 120 determining that the new candidate beam is associated with the first or second CORESET pool index values. Accordingly, UE 120 may update the QCL relationship for each CORESET associated with the first CORESET pool index value or second CORESET pool index value, respectively. Again, the updated QCL relationship may correspond to the QCL configuration of the new candidate beam. That is, when the new candidate beam corresponds to either CORESET pool index value, the QCL assumption for all CORESETS associated with the same value of CORESET pool index may be reset to the new candidate beam (e.g., 28 symbols after the last symbol carrying PDCCH). The set of activated TCI states for a PDSCH that correspond to the same value of CORESET pool index may be reset to the new candidate beam. Accordingly, UE 120 may update the activated set of TCI states for a data channel to a TCI state of the new candidate beam.

In some aspects, this may include UE 120 determining that the new candidate beam is associated with the first or second CORESET pool index value. UE 120 may update the CORESET pool index value of a common CORESET accordingly. For example, UE 120 may update the CORESET pool index value of the common CORESET to correspond to the CORESET pool index value of the new candidate beam. That is, when the new candidate beam corresponds to the first or second CORESET pool index value and one CORESET (e.g., the common CORESET) is configured for BFR, the CORESET pool index value of the CORESET that is associated with recovery search space ID(s) (e.g., recoverySearchSpaceId(s)) may be reset to the CORESET pool index value that the new candidate beam corresponds to.

In some examples, UE 120 may treat the second CORESET pool index value (e.g., CORESETPoolIndex=1) as an SCell for the BFR procedure. That is, UE 120 may determine that the beam failure on the active beam of PCell is associated with the first CORESET pool index value (e.g., CORESETPoolIndex=0 and is associated with the first TRP 215-*a*) and, therefore, perform a PCell BFR procedure. When BFD is detected for the first CORESET pool index value (e.g., CORESETPoolIndex=0), the procedures corresponding to a PCell BFR procedure may be followed (e.g., RACH transmission, PDCCH reception in a recovery search ID, etc., as is generally described with reference to operations 1300 of FIG. 13). However, UE 120 may determine that the beam failure on the active beam of PCell is associated with the second CORESET pool index value (e.g., CORESETPoolIndex=1 and is associated with the second TRP 215-b) and, therefore, perform a SCell BFR procedure. If BFD is detected for the second CORESET pool index value (e.g., CORESETPoolIndex=1) for PCell, the procedures corresponding to an SCell BFR procedure may be followed. For example, a link recovery request (LRR) message may be transmitted in a configured PUCCH resource, and a grant scheduling an uplink transmission for UE 120 may be received in response. In this situation, the medium access control (MAC) control element (CE) beam failure response may convey an indication of an additional Ci field and corresponding AC/candidate reference signal ID fields (e.g., when Ci=1) associated with the CORESET pool index value 1 in the PCell. The AC field may correspond to the candidate reference signal ID field.

Examples of beam failure declaration, candidate beam detection, beam recovery, and the like, are discussed with reference FIG. 9 which generally illustrates a PCell BFR procedure and FIG. 10 which generally illustrates an SCell BFR procedure.

Figure 9:
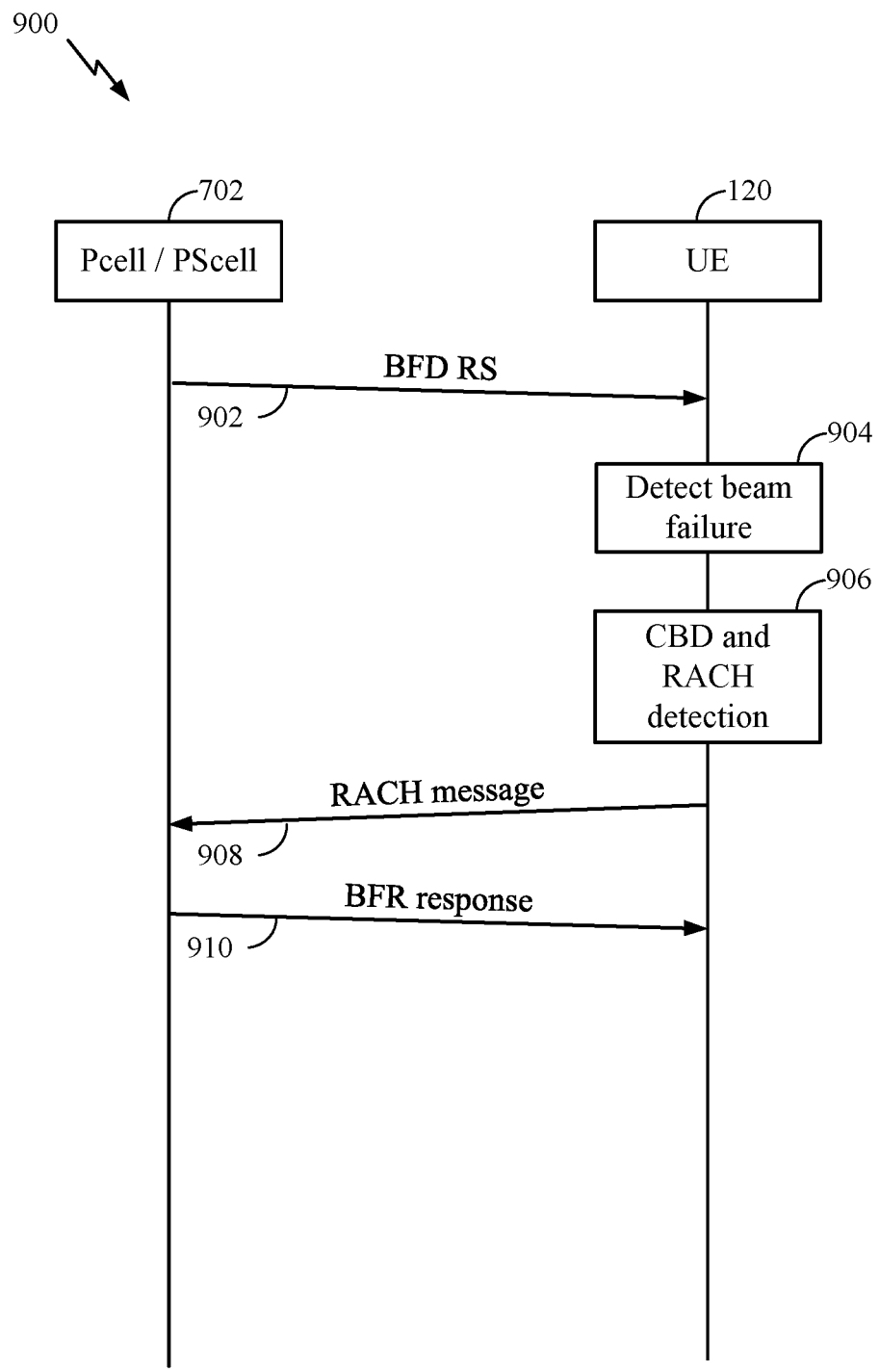
FIG. 9 is a call flow diagram illustrating an example beam failure recovery (BFR) process, in accordance with aspects of the present disclosure.

FIG. 9 illustrates an example of a process 900 that supports BFR for a multi-TRP in a PCell/PScell, in accordance with aspects of the present disclosure. In some examples, process 900 may implement aspects of wireless communication systems 100 and/or 700. Features of process 900 may be implemented by PCell/PScell and/or UE 120. In some examples, PCell/PScell may be associated with multiple TRPs 704.

PCell/PScell may configure UE 120 with a carrier that is configured with, or otherwise associated with, a first CORESET pool index value (e.g., CORESETPoolIndex=0) and a second CORESET pool index value (e.g., CORESETPoolIndex=1). PCell/PScell may also configure UE 120 with the set of candidate beams available for a BFR procedure, the set of candidate beams including a first subset of candidate beams associated with the first CORESET pool index value and a second subset of candidate beams associated with the second CORESET pool index value.

At 902, PCell/PsCell may transmit (and UE 120 may receive), a configuration for BFD reference signals (e.g., BFD RS(s)). That is, BFD may be based on periodic control state information-reference signal (CSI-RS) resources configured by radio resource control (RRC) (e.g., RRC parameter failureDetectionResources). Up to two single port reference signals may be configured. If not configured, the reference signal sets indicated by the active TCI states of CORESETs monitored by UE 120 may be used. For an active TCI state of a CORESET, there may be two reference signal indices (e.g., with which QCL Type-D may be used).

At 904, UE 120 may determine or otherwise declare a beam failure on an active beam of PCell/PScell associated with the first CORESET pool index value or the second CORESET pool index value. In some examples, the physical layer of UE 120 may assess the radio link quality according to the BFD set against a threshold (e.g., Qout). If the radio link quality is worse than Qout for all of the reference signals in the BFD resource set, the physical layer may provide an indication to higher layers (e.g., an indication that a beam failure has been detected).

At 906, UE 120 may select a new candidate beam based on monitoring a resource associated with the first CORESET pool index value or the second CORESET pool index value, e.g., perform CBD. In some examples, CBD may be based on periodic CSI-RS/SSB configured by RRC (e.g., RRC parameter candidateBeamRSList). In some examples, up to 16 resources may be configured with the corresponding random access preamble index (e.g., for RACH). Upon request from higher layers, UE 120 may provide a reference signal index and RSRP among the lists that have equal or larger RSRP values than a configurable threshold (e.g., Qin). For example, Qin may be defined as a level where a downlink radio link can be received meaningfully and reliably, and may correspond to a particular BLER (e.g., 2%) of a downlink transmission. UE 120 may initiate RACH procedures (e.g., contention-free RACH procedures) based on the random access resource (e.g., random access preamble index) associated with a selected reference signal index with an RSRP value above the threshold (e.g., RS index Qnew). Accordingly, and at 908, UE 120 may transmit (and PCell/PScell may receive) a RACH message, e.g., the access message.

At 910, PCell/PScell may transmit (and UE 120 may receive) a BFR response. For example, UE 120 may monitor PDCCH in a search space set, such as provided by a parameter (e.g., recoverySearchSpaceID), for detection of a DCI format, for example that is cyclic redundancy check (CRC) scramble by C-RNTI or MCS-C-RNTI starting from slot n+4. This may correspond to a random access response (e.g., BFR response in this case). If UE 120 receives the PDCCH within a window, the BFR procedure may be considered complete. In some aspects, the CORESET associated with the secondary synchronization signal (SSS) provided by recoverySearchSpaceID may not be used for any other SSS.

Typically, various QCL assumptions may be adopted after RACH. For PDCCH monitoring and a SSS provided by recoverySearchSpaceID and for corresponding PDSCH receptions, UE 120 may assume the same QCL parameters as the ones associated with the R index Qnew (e.g., the QCL parameters of the new candidate beam) until UE 120 receives, e.g., by higher layers, an activation for a TCI state or any of the parameters TCI-StatesPDCCH-ToAddList and/or TCI-StatesPDCCH-ToReleaseList. After, for example the $28^{th}$, symbol from a last symbol of a first PDCCH reception and a SSS provided by recoverySearchSpaceID where UE 120 detects a DCI format with CRC scramble by C-RNTI or MCS-C-RNTI, UE 120 may assume the same QCL parameters as the ones associated with the reference signal index Qnew for PDCCH monitoring in a CORESET with pool index value 0.

However, according to aspects of the described techniques UE 120 may monitor for an access response message (e.g., the BFR response) on a first recovery search configured with a first CORESET that is associated with the first CORESET pool index value or on a second recovery search space configured with a second CORESET that is associated with the second CORESET pool index value. That is, two different CORESETS may be associated with two different recovery search spaces (e.g., two recoverySearchSpaceIDs can be configured). The two CORESETs may be configured with different CORESET pool index values. A recoverySearchSpaceID may be associated with a CORESET pool index value through the corresponding CORESET. Accordingly, UE 120 may determine that the new candidate beam is associated with the first subset of candidate beams and monitor for an access response message (e.g., the BFR response) on the first recovery search space. Similarly, UE 120 may determine that the new candidate beam is associated with the second subset of candidate beams and monitor for an access response message (e.g., the BFR response) on the second recovery search space. UE 120 may receive a control channel signal (e.g., PDCCH, which may include the access response message, or BFR response in this example) and the corresponding recovery search space and determine that the BFR procedure is complete based on receiving the control channel signal in the corresponding recovery search space.

In some aspects, only one CORESET may be used for BFR purposes. For example, UE 120 may monitor for the access response message (e.g., the BFR response) on a first recovery search associated with the first CORESET pool index value or on a second recovery search space associated with the second CORESET pool index value. In this example, the first and second recovery search spaces may be associated with a common CORESET (e.g., the single CORESET used for BFR purposes). In one example, this may include two recoverySearchSpaceIDs being configured, both associated with the same CORESET. The first recovery search space (e.g., the first recoverySearchSpaceId) may be associated with the first CORESET pool index value (e.g., CORESETPoolIndex=0) and the second recovery search space (e.g., the second recoverySearchSpaceID) may be associated with the second CORESET pool index value (e.g., CORESETPoolIndex=1). This association between the second recovery search space and the second CORESET pool index value may be a direct association (e.g., not through the CORESET).

If the RACH message transmitted at 908 in slot n is associated with a new candidate beam (e.g., Qnew) that is associated with the value of CORESET pool index, UE 120 may monitor PDCCH in a search space set, such as provided by recoverySearchSpaceID that is associated with the same value of CORESET pool index, such as for detection of a DCI format with CRC scrambled by C-RNTI or MCS-C-RNTI starting from, for example, slot n+4. The BFR procedure for a CORESET pool index value may be completed at 910 when UE 120 receives PDCCH (e.g., the BFR response) in the corresponding recovery search space. PDCCH and corresponding PDSCH reception may use the same beam as Qnew uses (e.g., the new candidate beam).

Accordingly, UE 120 may determine that the new candidate beam is associated with the first subset of candidate beams and monitor for an access response message (e.g., the BFR response) on the first recovery search space. Similarly, UE 120 may determine that the new candidate beam is associated with the second subset of candidate beams and monitor for an access response message (e.g., the BFR response) on the second recovery search space. UE 120 may receive a control channel signal (e.g., PDCCH, which may be an example of the access response message, or BFR response in this example) in the corresponding recovery search space and determine that the BFR procedure is complete, at 912, based on receiving the control channel signal in the corresponding recovery search space.

Figure 10:
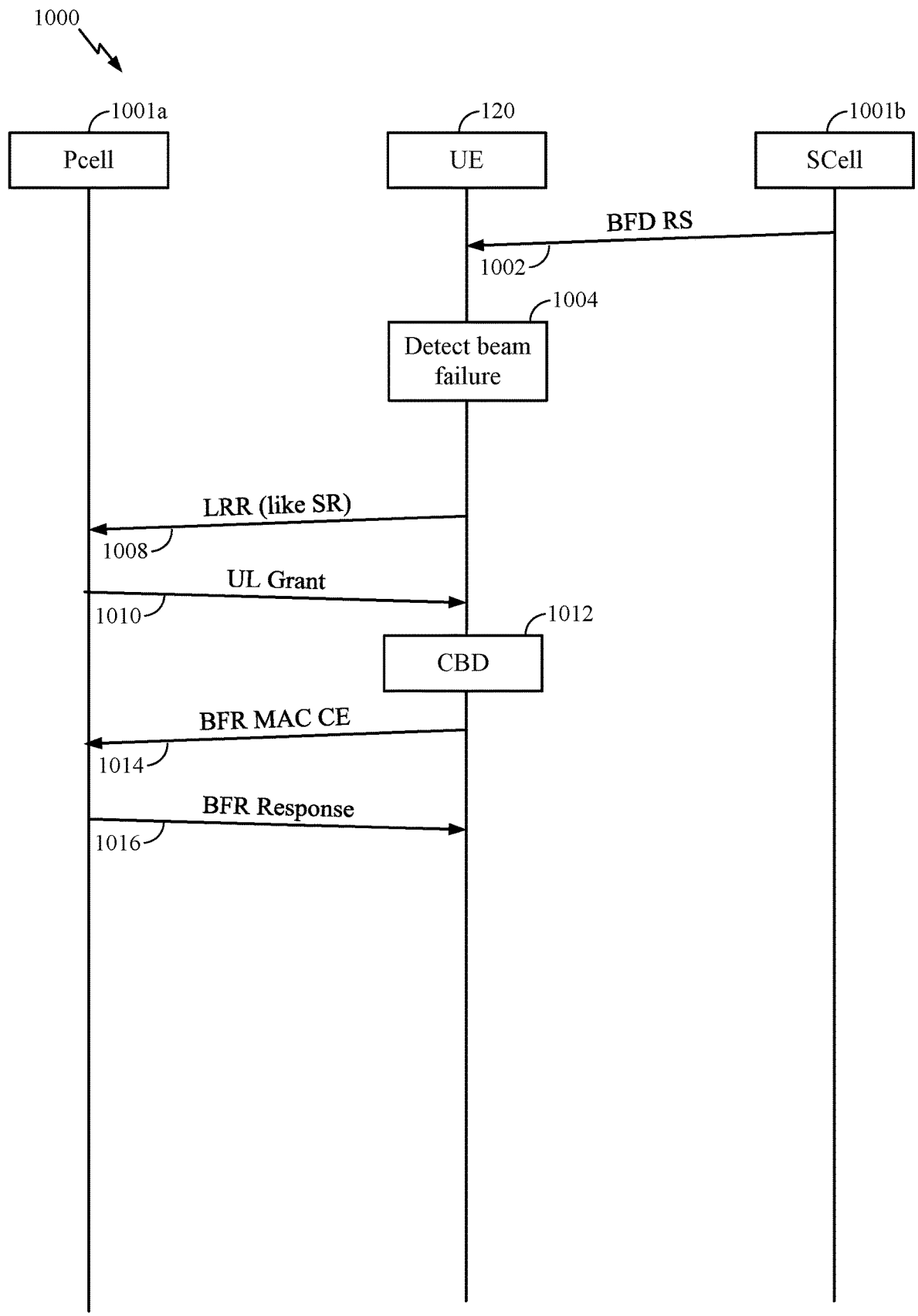
FIG. 10 is a call flow diagram illustrating another example BFR process, in accordance with aspects of the present disclosure.

FIG. 10 illustrates example operations 1000 that supports BFR for a multi-TRP in a PCell, in accordance with aspects of the present disclosure. In some examples, operations 1000 may implement aspects of wireless communication systems 100 and/or 700, and/or process 900. Aspects of operations 1000 may be implemented by PCell 1001*a*, UE 120, and/or SCell 1001*b*, which may be examples of corresponding devices described herein. In some aspects, PCell and/or SCell may each be associated with multiple TRPs 704, respectively. Operations 1000 illustrates an example of an SCell BFR procedure that may be modified, at least in some aspects, according to the described techniques when a carrier on PCell experiences beam failure.

PCell may configure UE 120 with a carrier that is configured with, or otherwise associated with, a first CORESET pool index value (e.g., CORESETPoolIndex=0) and a second CORESET pool index value (e.g., CORESETPoolIndex=1). PCell may also configure UE 120 with the set of candidate beams available for a BFR procedure, the set of candidate beams including a first subset of candidate beams associated with the first CORESET pool index value and a second subset of candidate beams associated with the second CORESET pool index value.

As mentioned above, aspects of the described techniques may involve using a SCell BFR procedure when the beam failure on the active beam of PCell is associated with the second CORESET pool index value (e.g., CORESETPoolIndex=1). Operations 1000 illustrates one non-limiting example of such a BFR procedure.

At 1002, SCell may transmit (and UE 120 may receive) a configuration for BFD reference signals. That is, BFD may be based on periodic CSI-RS resources configured by RRC (e.g., RRC parameter failureDetectionResources). At 1004, UE 120 may determine or otherwise detect a beam failure on an active beam of SCell associated with the first CORESET pool index value or the second CORESET pool index value.

At 1006, UE 120 may declare a beam failure and initiate BFR. Although operations 1000 illustrates beam failure based on the reference signals and BFD based on SCell b, aspects of the described techniques may use the same process for BFD on PCell 1001*a*. That is, although operations 1000 illustrates UE 120 detecting or otherwise declaring BFD on SCell 1001*b*, it is to be understood that, in accordance with the described techniques, UE 120 may similarly detect or otherwise declare BFD on a carrier of PCell a.

At 1008, UE 120 may transmit (and PCell may receive) a LRR message. The LRR message may be transmitted on PCell (e.g., PUCCH-PCell and/or PUCCH-SCell) in which the PUCCH BFR is configured. The LRR message may be similar to a scheduling request (SR) and use PUCCH format 0 or 1. The LRR message may be transmitted in an uplink control channel.

At 1010, PCell may transmit (and UE 120 may receive) a normal uplink (UL) grant. The UL grant may include or use C-RNTI/MCS-C-RNTI and may serve as a response message to the LRR message. The UL grant may schedule a physical uplink shared channel (PUSCH) for UE 120 in which a BFR MAC CE may be transmitted. If UE 120 already has an UL grant configured, the LRR message transmitted at 1008 and the UL grant transmitted at 1010 may be skipped.

At 1012, UE 120 may perform CBD. That is, before sending the BFR response indicating the MAC CE, UE 120 may identify a suitable (e.g., the best) new beam (e.g., select a new candidate beam) for the failed SCell (or PCell in this example). CBD may be similar to the description provided in operations 1000. Up to 64 resources (e.g., candidateBeamRSSCellList, or candidateBeamRSPCellList in this example) may be configured in the set of candidate beams and they may be transmitted on the failed SCell (or PCell in this example) or on another CC in the same band. In some aspects, the BFR procedure illustrated in operations 1000 may not include a RACH process and, therefore, CBD resources may not be associated with a RACH resource.

At 1014, UE 120 may transmit (and PCell may receive) a BFR MAC CE. In some aspects, the BFR MAC CE may carry or otherwise convey an indication of which cell the beam failure has occurred (e.g., a SCell index, or a PCell index in this example) and/or identify potential new candidate beams. For example, the BFR MAC CE may include a first row of $C_i$ indications (e.g., up to eight $C_i$ indications), with each $C_i$ indication set to 1 to indicate that BFD has occurred in that CC. For each $C_i$ indication set to 1, a subsequent row in the MAC CE may include an access control (AC) field set to 1 indicating that the candidate reference signal ID field is present. The remaining bits in the row may carry the candidate reference signal ID. The BFR MAC CE may be transmitted to PCell and/or SCell (e.g., may be transmitted to any cell, including the failed cell).

Accordingly, in some aspects UE 120 may configure the access message (e.g., BFR MAC CE) to indicate the CORESET pool index value associated with the detected beam failure. That is, the MAC CE may explicitly indicate the CORESET pool index value corresponding to the BFD.

In some examples, UE 120 may configure the access message (e.g., BFR MAC CE) to indicate the beam failure was detected on the PCell 1001a. In this example, UE 120 may transmit or otherwise convey the access message using a first set of random access resources associated with the first CORESET pool index value or using a second set of random access resources associated with the second CORESET pool index value. That is, the MAC CE may only indicate the BFD for PCell 1001a, and the RACH resource/random access preamble index may implicitly determine (e.g., indicate) the CORESET pool index value associated with the BFD (e.g., and the Qnew/new candidate beam for that CORESET pool index value).

At 1016, PCell may transmit (and UE 120 may receive) a BFR response. In some aspects, the BFR response to the MAC CE may be an UL grant scheduling a new transmission (e.g., with a toggled/changed new data indicator (NDI), meaning the NDI is set to a value indicated there is new data) for the same hybrid automatic repeat request (HARQ) process as the PUSCH carrying the MAC CE. In this example, the DCI may indicate which HARQ process to be used by the UE 120. Since transmissions and retransmissions are scheduled using the same framework, the UE 120 may need to know whether the transmission is a new transmission (e.g., in which case the UE 120 may flush a soft buffer to make room for the new data), or a retransmission (e.g., in which case the UE 120 may perform soft combining of new data with data currently in the buffer). Thus, the NDI bit may be set to indicate whether the transmission will include new data and the receive buffer should be flushed. If the new candidate beam is reported in the BFR MAC CE, such as 28 symbols from the end of the BFR response (e.g., in the PDCCH), all CORESET beams on the failed cell (e.g., SCell 1001b, or PCell 1001a in this example), may be reset to the new candidate beam. If the failed cell is a PUCCH-SCell, the PUCCH-spatialRelationInfo may be configured. If the LLR is not transmitted on the failed cell, PUCCH beams on the failed cell may be reset to the new candidate beam.

At 1016, UE 120 may receive a control channel signal (e.g., PDCCH, which may be an example of the access response message, or BFR response in this example) in the corresponding recovery search space and determine that the BFR procedure is complete.

In some examples, this may include UE 120 monitoring for an access response message (e.g., the BFR response) on a first recovery search space configured with a first CORESET that is associated with the first CORESET pool index value or on a second recovery search space configured with a second CORESET that is associated with the second CORESET pool index value. That is, two different CORESETs may be associated with two different recovery search spaces (e.g., two recoverySearchSpaceIDs can be configured). The two CORESETs may be configured with different CORESET pool index values. A recoverySearchSpaceID may be associated with a CORESET pool index value through the corresponding CORESET. Accordingly, UE 120 may determine that the new candidate beam is associated with the first subset of candidate beams and monitor for an access response message (e.g., the BFR response) on the first recovery search space. Similarly, UE 120 may determine that the new candidate beam is associated with the second subset of candidate beams and monitor for an access response message (e.g., the BFR response) on the second recovery search space. UE 120 may receive a control channel signal (e.g., the access response message, or BFR response in this example) in the corresponding recovery search space and determine that the BFR procedure is complete based on receiving the control channel signal in the corresponding recovery search space.

In some examples, only one CORESET may be used for BFR purposes. For example, UE 120 may monitor for the access response message (e.g., the BFR response) on a first recovery search space associated with the first CORESET pool index value or on a second recovery search space associated with the second CORESET pool index value. In this example, the first and second recovery search spaces may be associated with a common CORESET (e.g., the single CORESET used for BFR purposes). In one example, this may include two recoverySearchSpaceIDs being configured, both associated with the same CORESET. The first recovery search space (e.g., the first recoverySearchSpaceID) may be associated with the first CORESET pool index value (e.g., CORESETPoolIndex=0) and the second recovery search space (e.g., the second recoverySearchSpaceID) may be associated with the second CORESET pool index value (e.g., CORESETPoolIndex=1). This association between the second recovery search space and the second CORESET pool index value may be a direct association (e.g., not through the CORESET).

Figure 11A:
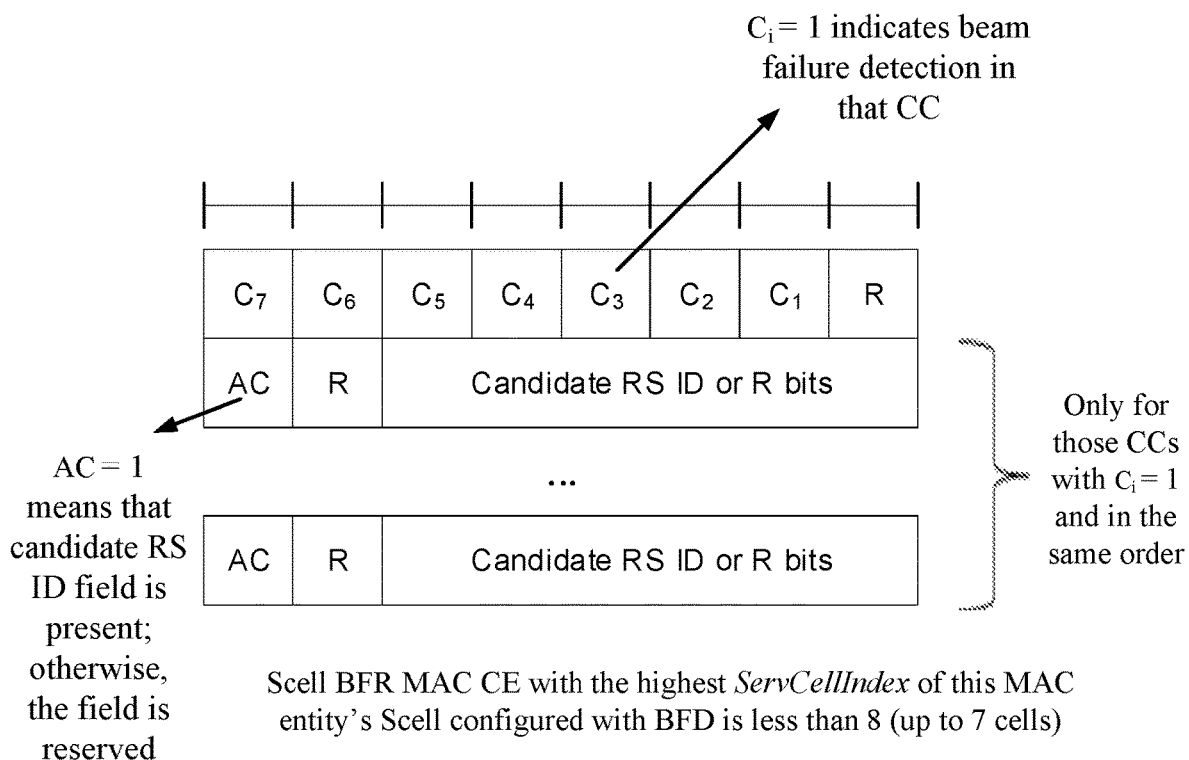
FIGS. 11A and 11B illustrate example BFR MAC-CE structures, according to aspects of the present disclosure.
Figure 11B:
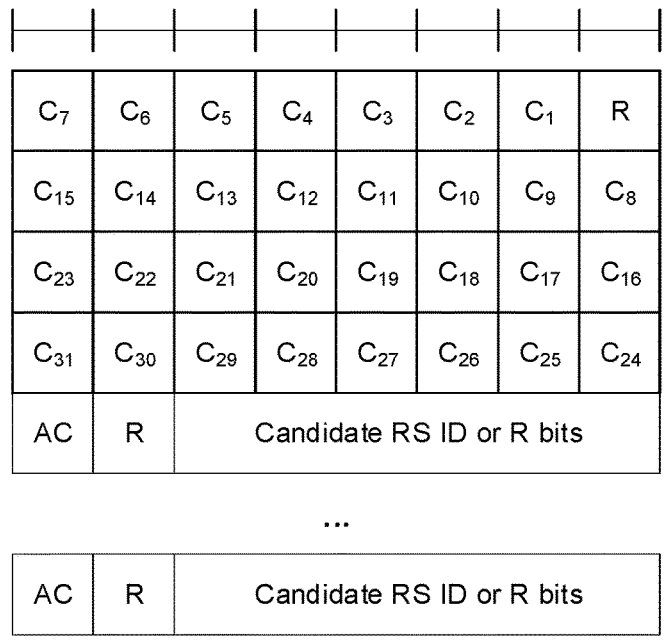

FIGS. 11A and 11B illustrate example MAC CE structures that may be used for BFR purposes. FIG. 11A, shows an example Scell BFR MAC CE with a highest SERVCellIndex less than eight (e.g., include a first row of $C_i$ indications up to seven $C_i$ indications for seven Scells). A Ci indication equal to 1 indicates a beam failure detection in that CC. When Ci=1, the BFR MAC CE may convey an indication of an additional Ci field and corresponding AC/candidate reference signal ID fields associated with the CORESET pool index value 1 in the PCell. The AC field may correspond to the candidate reference signal ID field.

FIG. 11B illustrates an example Scell BFR MAC CE with a field structure which includes the highest SERVCellIndex greater than 8 (21 in the example).

Example Configuration of PUCCH-BFR for TRP Specific BFR

As mentioned above, a UE may be provided with BFD resources enabling the UE to perform BFD and CBD operations. However, the introduction of a multi-TRP operation to increase system capacity as well as reliability in the wireless communication system may present certain challenges with regard to BFD and BFR procedures.

In some cases, further clarification may be desirable regarding techniques and apparatuses for per-TRP BFR, which enables separate BFD and separate CBD for the beams corresponding to a TRP in a control channel that is configured with two values of CORESET pool indices.

Potential enhancements to enable per-TRP based beam failure recovery may include TRP-specific BFD, TRP-specific new candidate beam identification, TRP-specific BFRQ, BS (e.g., gNB) response enhancement, and UE behavior clarification on QCL, spatial relation assumption, UL power control for DL and UL channels, and after receiving the response from the BS.

Aspects of the present disclosure provide enhancements to enable per beam group based (effectively per-TRP based) beam failure recovery, and more particularly, techniques for the configuration of physical uplink control channel (PUCCH) beam failure recovery (BFR) for transmission reception point (TRP) (or beam group) specific BFR. In TRP specific BFR, after UE transmits BFRQ to initiate the TRP (beam group) specific BFR, the timing (and signalling mechanism) for the gNB response for the TRP specific BFRQ should be specified. This allows the UE to know that the BFRQ transmission is successful and, hence, the UE may stop further BFRQ attempts.

Aspects of the present disclosure provide various options for the gNB response to TRP specific BFRQ, for example, depending on how the BFRQ is sent. For example, the gNB response may depend on whether the BFRQ information is sent in TRP specific BFR MAC-CE (Referred to herein as Case 1), the BFRQ is sent as the preamble in CFRA MsgA/1 (Referred to herein as Case 2), or the BFRQ is sent in UCI carried in PUCCH/PUSCH (Referred to herein as Case 3).

In one or more of these cases, after X symbols form receiving the gNB response, both gNB and UE may reset the beam(s) and/or power control parameters for certain channels/RSs, at least for those channels/RSs associated with the failed TRP, if a new candidate beam is identified for the failed TRP.

Figure 12:
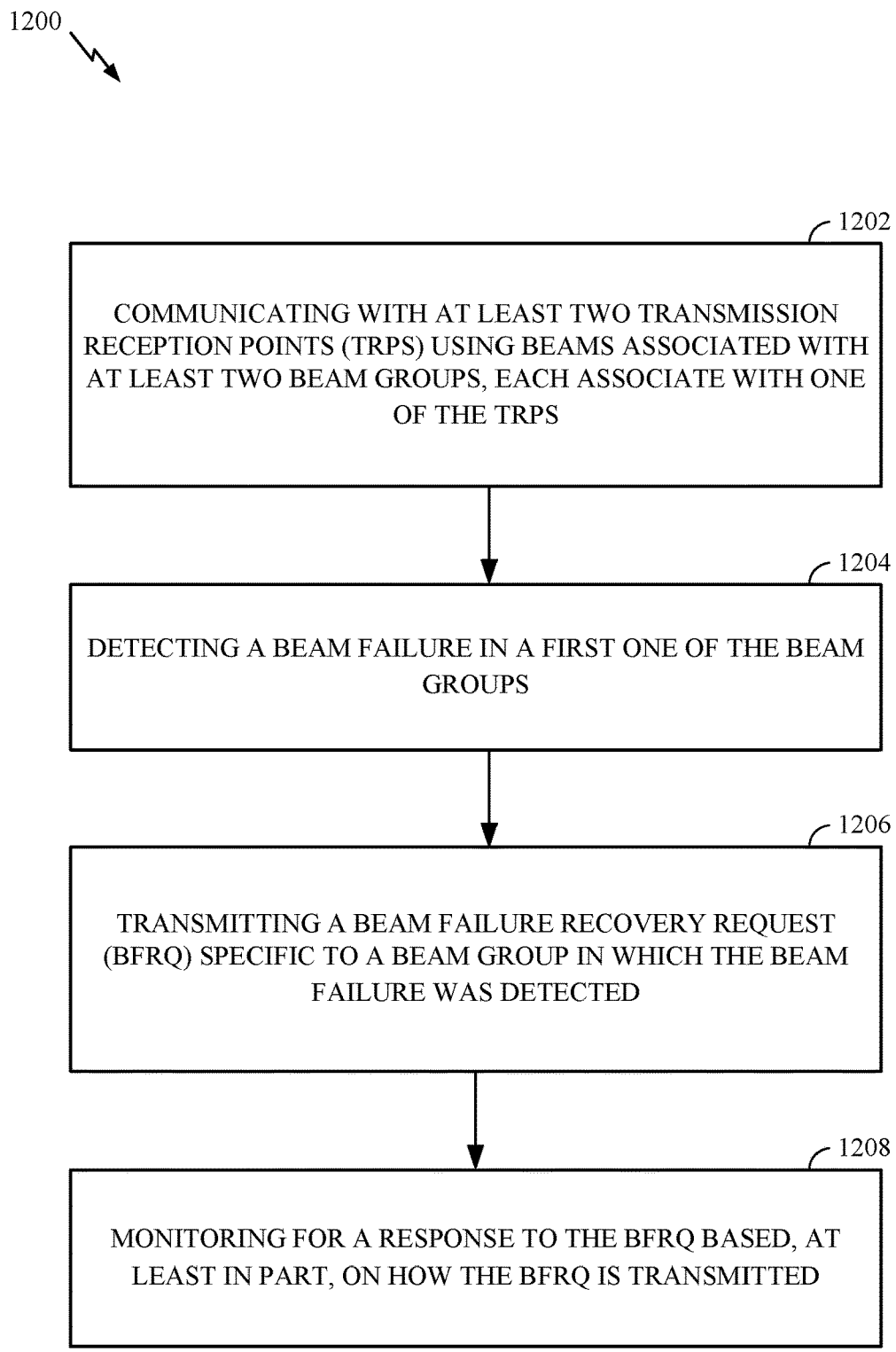
FIG. 12 is a flow diagram illustrating example operations for wireless communication by a UE, according to aspects of the present disclosure.

FIG. 12 is a flow diagram illustrating example operations 1200 for wireless communication, in accordance with certain aspects of the present disclosure. The operations 1200 may be performed, for example, by a UE (e.g., such as the UE 120a in the wireless communication network 100). The operations 1200 may be implemented as software components that are executed and run on one or more processors (e.g., controller/processor 280 of FIG. 2). Further, the transmission and reception of signals by the UE in operations 1200 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1200 begin, at 1202, by communicating with at least two transmission reception points (TRPs) using beams associated with at least two beam groups, each associate with one of the TRPs.

At 1204, the UE detects a beam failure in a first one of the beam groups.

At 1206, the UE transmits a beam failure recovery request (BFRQ) specific to a beam group in which the beam failure was detected.

At 1208, the UE monitoring for a response to the BFRQ based, at least in part, on how the BFRQ is transmitted.

Figure 13:
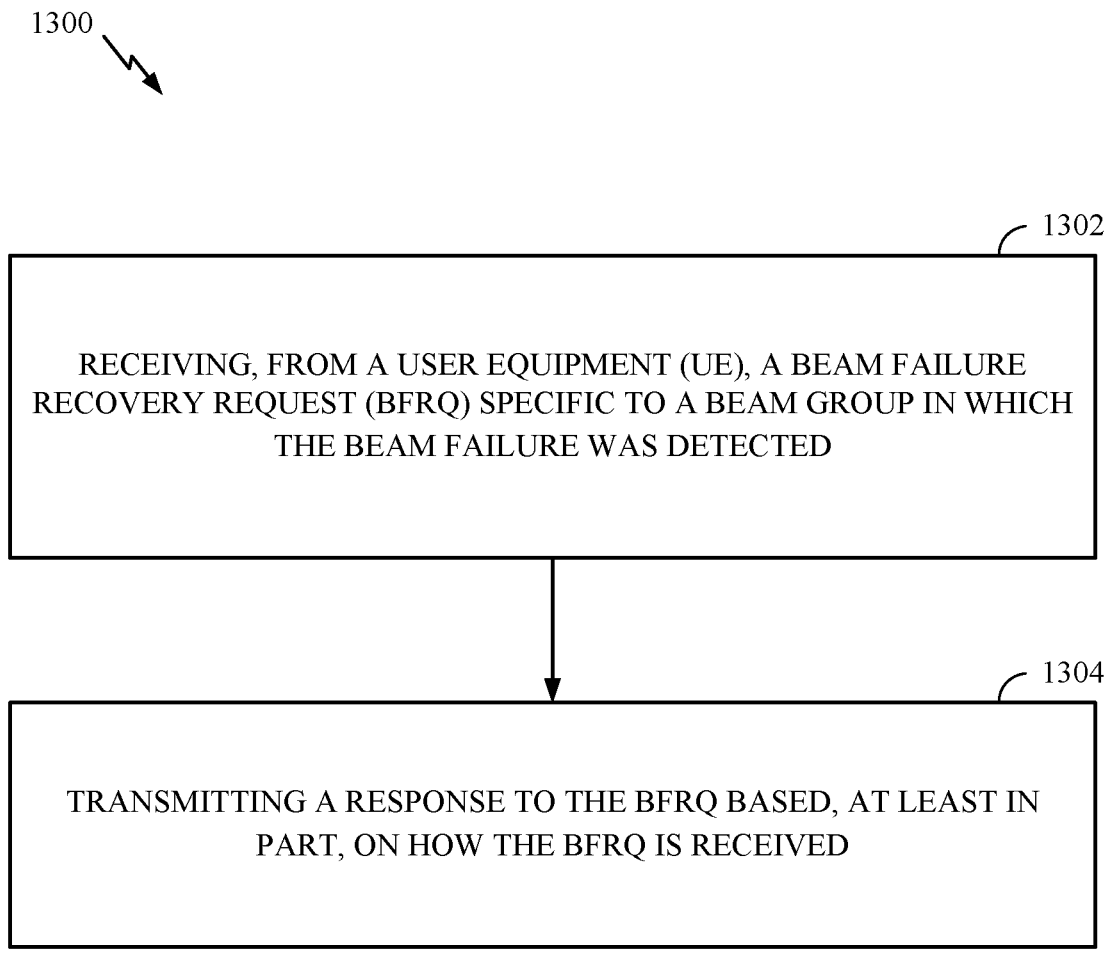
FIG. 13 is a flow diagram illustrating example operations for wireless communication by a network entity, according to aspects of the present disclosure.

FIG. 13 is a flow diagram illustrating example operations 1300 for wireless communication, in accordance with certain aspects of the present disclosure. The operations 1300 may be performed, for example, by a network entity (e.g., such as the BS 110a in the wireless communication network 100). The operations 1300 may be implemented as software components that are executed and run on one or more processors (e.g., controller/processor 240 of FIG. 2). Further, the transmission and reception of signals by the BS in operations 1300 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 1300 begin, at a first block 1302, by receiving, from a user equipment (UE), a beam failure recovery request (BFRQ) specific to a beam group in which the beam failure was detected.

At a second block 1304, the TRP transmits a response to the BFRQ based, at least in part, on how the BFRQ is received.

In certain aspects, based on the BFRQ being received via a beam group specific beam failure recovery (BFR) medium access control (MAC) control element (CE), the response is transmitted in a downlink control information (DCI) scheduling a new physical uplink shared channel (PUSCH) with a same hybrid automatic repeat request (HARQ) ID as a PUSCH carrying the beam group specific BFR MAC CE.

In certain aspects, the new PUSCH is indicated via a new data indicator (NDI) in the DCI.

In certain aspects, the response to the BFRQ is transmitted in the DCI scheduling the new PUSCH based on the BFRQ being transmitted via the beam group specific BFR MAC CE in a previous PUSCH scheduled or activated by a previous DCI.

In certain aspects, based on the BFRQ being received via a beam group specific beam failure recovery (BFR) medium access control (MAC) control element (CE) that is not scheduled or activated by a downlink control information (DCI), the response is transmitted via: a DCI including a cell radio network temporary identifier (C-RNTI); a DCI including a modulation and coding scheme C-RNTI (MCS-C-RNTI); or a message including a contention resolution ID matching that of the UE.

In certain aspects, based on the BFRQ being received via a preamble in a contention free random access (CFRA) procedure, the response is transmitted in a downlink control information (DCI) search space configured for a beam group specific BFRQ.

In certain aspects, based on the BFRQ being received via uplink control information (UCI) carried in a physical uplink control channel (PUCCH) or physical uplink shared channel (PUSCH), the response is transmitted via a downlink acknowledgment (ACK).

In certain aspects, the downlink ACK is transmitted via a standalone or transmission-scheduling downlink control information (DCI).

In certain aspects, the response to the BFRQ is transmitted via a downlink control information (DCI), and wherein the DCI is scrambled with a special radio network temporary identifier (RNTI).

In certain aspects, the BFRQ is a beam group specific BFRQ, and wherein the special RNTI is dedicated to the beam group specific BFRQ.

As noted above, a TRP may itself be a BS, or each TRP may be a radio head (RH) for a base station, where a BS may have multiple RHs. In some examples, the TRP response to a TRP (e.g., beam group) specific BFRQ may depend on whether the BFRQ is sent in TRP specific BFR MAC-CE (Case 1), as the preamble in CFRA MsgA/1 (Case 2), or in UCI carried in PUCCH/PUSCH (Case 3).

There are various options for the first case, when BFRQ info is sent in TRP specific BFR MAC-CE. According to a first option, the response may be sent via the next DCI scheduling a new PUSCH transmission with a same HARQ ID as the PUSCH carrying the TRP specific BFR MAC-CE.

The new PUSCH transmission may be indicated by a toggled new data indicator (NDI) field in the DCI. In some cases, the MAC-CE may be sent in MsgA/3 whose HARQ ID is 0. In some cases, this option may be restricted to a MAC-CE not sent in MsgA/3 in 2/4-step RACH (e.g., restricted to a MAC-CE sent in a PUSCH scheduled/activated by DCI).

If the MAC-CE is sent in a MsgA/3 in 2/4-step RACH procedure, the response may have various additional/alternative options. According to one such option, the response is sent via the next DCI with C-RNTI or MCS-C-RNTI after MsgA/3 (at least when the RACH is CBRA and C-RNTI MAC-CE is sent in MsgA/3). According to another such option, the response may be sent via the MsgB/4 containing a UE Contention Resolution Identity matching that of the UE (at least when the RACH is CBRA and C-RNTI MAC-CE is not sent in MsgA/3).

When the BFRQ is sent as the preamble in CFRA MsgA/1, the response may be sent via the DCI with C-RNTI or MCS-C-RNTI received in a search space configured to receive the response for the TRP specific BFRQ (e.g., a BFRQ unique to a particular TRP or a BFRQ unique to a particular beam group of the TRP). In such cases, the UE may use a same Rx beam for receiving the candidate beam associated with the RACH occasion where the preamble is sent. In some cases, the candidate beam, RACH occasion, and/or the search space for the CFRA based TRP specific BFR may be configured by RRC signaling, for example, in the same information element (IE).

When the BFRQ is sent in UCI carried in PUCCH/PUSCH, the response may be sent via a downlink acknowledgment (of the PUCCH/PUSCH) from the gNB. In some cases, this downlink acknowledgment may be carried in a DCI scheduling DL/UL transmission or in a standalone DCI (without scheduling any transmission). In either case, the DCI may carry a bitmap indicating ACK/NACK (A/N) for each of multiple packets carrying UCI, which can be transmitted sequentially in a time window. As an alternative, the downlink acknowledgment for BFRQ can be sent in a MAC-CE in PDSCH.

For any of the cases (1-3) discussed above, if the response is conveyed via a DCI, the DCI can be scrambled with a special RNTI, sent by a CORESET with special ID or group ID, and/or sent in a special search space. Such a RNTI, ID, group ID, or search space may be considered special if dedicated to reception of the response for TRP specific BFRQ. A CORESET group ID may include a CORESET pool index in case of multi-DCI (mDCI) based multi-TRP (mTRP) scenarios.

Beam resetting (and power control parameter resetting) typically occurs sometime after a gNB response is received (which indicates the BFRQ was successfully received). For example, in some cases, after X symbols from receiving the gNB response, both the gNB and UE may reset the beam(s) and/or power control parameters for certain channels/RSs (at least those channels/RSs associated with the failed TRP), if a new candidate beam is identified for the failed TRP.

The channel(s)/RS(s) may include any combinations of PDCCH, PDSCH, CSI-RS, PUCCH, PUSCH, SRS, and any combinations of various types per channel/RS listed herein.

Beam resetting for PDCCH may include CORESET(s) with different ID(s). In some cases, the beam resetting may be applied to a subset of CORESET(s) associated with the failed TRP (e.g. the CORESET with lowest ID associated with the failed TRP in the active DL BWP of the serving cell).

Beam resetting for PDSCH may include that scheduled with offset from the scheduling DCI greater or less than the beam switch latency threshold. For example, the beam resetting may be applied to the PDSCH with offset both greater and less than the threshold.

Beam resetting for SRS may include any combinations of SRS types with purposes for codebook, non-codebook, antenna switching, beam management, and/or positioning. For example, the beam resetting may be applied to only SRS for codebook and non-codebook purposes.

Beam resetting for CSI-RS may include any combination of CSI-RS types with purposes for channel state feedback (CSF), beam management (BM), tracking reference signals (TRS), or positioning. For example, the beam resetting may be applied to only the CSF and TRS.

For any such beam resetting, the beam(s) of those channel (s)/RS(s) may be reset with the following options. According to a first option, the beam(s) are reset to the new candidate beam reported in TRP specific BFR MAC-CE if exists. According to a second option, the beam(s) are reset to the new candidate beam selected by UE to transmit the preamble in RACH based TRP specific BFR.

In some cases, the reset power control parameters associated with reset beam(s) for UL channel(s)/RS(s) may include P0, alpha, close-loop index, and pathloss RS.

In some cases, the gNB and/or UE can know (identify) the failed TRP ID (beam group ID) with the following options. According to a first option, a failed TRP ID is explicitly reported in MAC-CE/UCI. According to a second option, a failed TRP ID is implied by selected candidate beam, RACH occasion, search space for receiving BFRQ response, which can be configured/indicated per TRP.

In some cases, the failed TRP ID associated with the channel(s)/RS(s) to which beam resetting will be applied can be identified via various options, for a TRP ID associated with a CORESET, for mDCI mTRP (indicated by CORESET Pool index per CORESET) or for sDCI mTRP. According to a first option, the failed TRP ID is indicated by a new TRP ID per CORESET, or implied by CORESET ID if its ID space is split among TRPs. According to a second option, the failed TRP ID is indicated by the TRP ID associated with the TCI state assigned to the CORESET. In some cases, TRP ID per TCI state may be indicated by a new TRP ID per TCI state, or implied by TCI state ID if its ID space is split among TRPs.

There are also various options for TRP ID associated with other type of channel/RS. According to a first option, the TRP ID can be configured in the channel/RS resource configuration. According to a second option, the TRP ID is indicated by the DCI scheduling/activating the transmission of the channel/RS. According to a third option, the TRP ID is implied by the TRP ID associated with the CORESET carrying the DCI scheduling/activating the transmission of the channel/RS.

In some cases, the new candidate beam resetting certain channel(s)/RS(s) at least for a failed TRP in the active BWP of a CC can be applied to the active BWP or all BWPs of multiple CCs.

If the new candidate beam is applied to a particular type of channel/RS for a failed TRP ID in the active BWP of a CC, it may also be applied to the same type of channel/RS for the same TRP ID to the active BWP or all BWPs of multiple CCs. For example, if the new candidate beam is applied to all CORESETs & PUCCH resources associated with TRP 1 in the active BWP in CC 1, it is also applied to all CORESETs & PUCCHs associated with TRP 1 in all BWPs of every CC in a CC list.

If the new candidate beam is applied to a particular resource ID of channel/RS for a failed TRP ID in the active BWP of a CC, it may also be applied to the same resource ID of channel/RS for the same TRP ID to the active BWP or all BWPs of multiple CCs. For example, if the new candidate beam is applied to CORESET with ID 0 or lowest ID associated with TRP 1 in the active BWP of CC 1, it is also applied to CORESET with ID 0 or lowest ID associated with TRP 1 in all BWPs of every CC in a CC list.

In some cases, the gNB may configure multiple CC lists for DL and UL beam resetting, respectively. In case of multiple CC lists in DL and/or in UL, the DL/UL CC list containing the CC with the failed TRP may be used to perform cross-CC DL/UL beam resetting.

Figure 14:
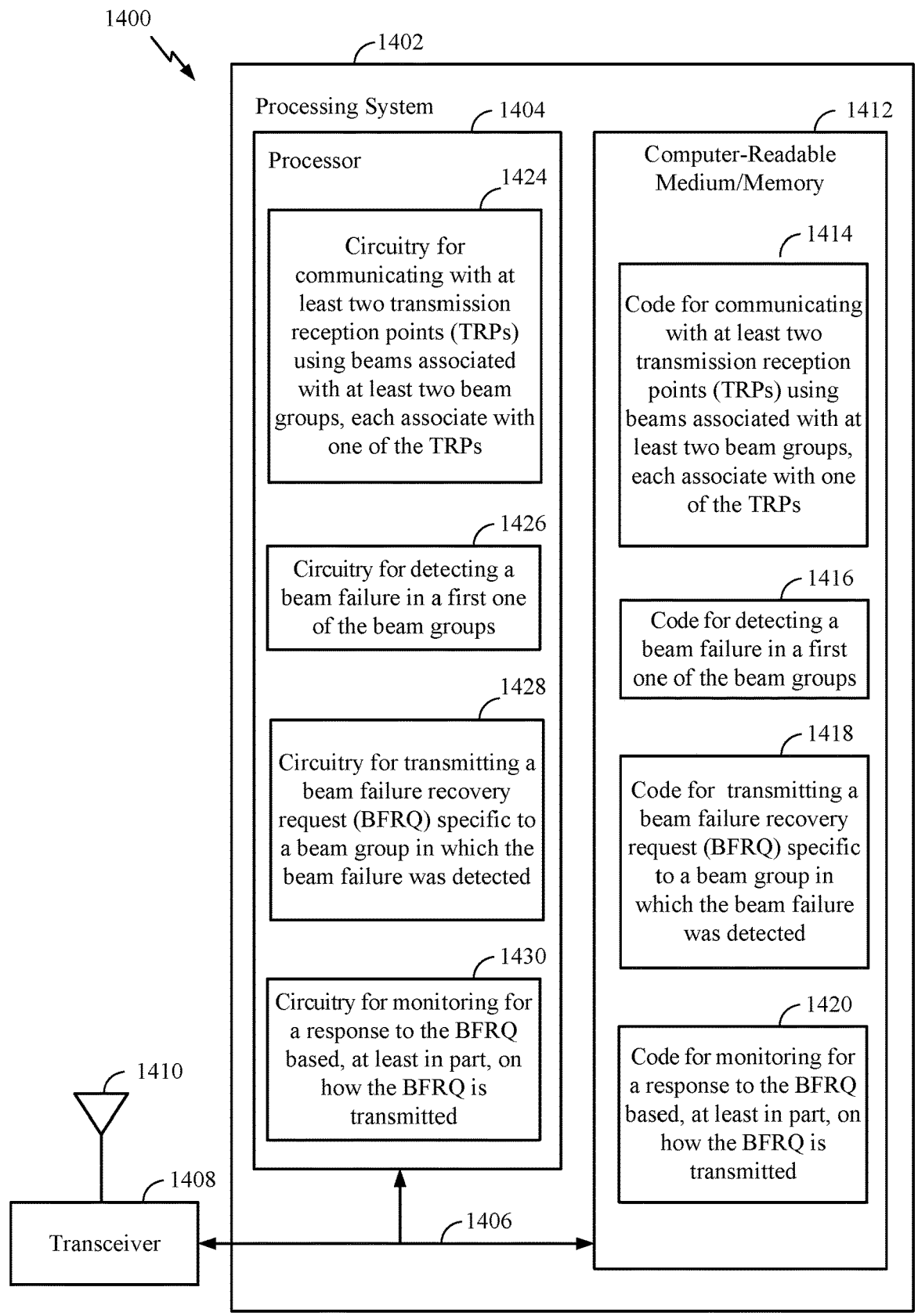
FIG. 14 illustrates a communications device that may include various components configured to perform operations for techniques disclosed herein, according to aspects of the present disclosure.

FIG. 14 illustrates a communications device 1400 that may include various components (e.g., corresponding to means-plus-function components) configured to perform operations for the techniques disclosed herein, such as the operations illustrated in FIG. 12. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 12, or other operations for performing the various techniques discussed herein for configuration of PUCCH BFR for TRP specific BFR. In certain aspects, computer-readable medium/memory 1412 stores code 1414 for communicating with at least two transmission reception points (TRPs) using beams associated with at least two beam groups, each associate with one of the TRPs; code 1416 for detecting a beam failure in a first one of the beam groups; code 1418 for transmitting a beam failure recovery request (BFRQ) specific to a beam group in which the beam failure was detected; and code 1420 for monitoring for a response to the BFRQ based, at least in part, on how the BFRQ is transmitted. In certain aspects, the processor 1404 has circuitry configured to implement the code stored in the computer-readable medium/memory 1412. The processor 1404 includes circuitry 1424 for communicating with at least two transmission reception points (TRPs) using beams associated with at least two beam groups, each associate with one of the TRPs; circuitry 1426 for detecting a beam failure in a first one of the beam groups; circuity 1428 for transmitting a beam failure recovery request (BFRQ) specific to a beam group in which the beam failure was detected; and circuitry 1430 for monitoring for a response to the BFRQ based, at least in part, on how the BFRQ is transmitted.

In certain aspects, means for transmitting (e.g., means for communicating or means for outputting for transmission) may include a transmitter unit 254 and/or antenna(s) 252 of the UE 120a illustrated in FIG. 2 and/or circuitry 1424 for communicating with at least two transmission reception points (TRPs) using beams associated with at least two beam groups, each associate with one of the TRPs, and circuitry 1428 for transmitting a beam failure recovery request (BFRQ) specific to a beam group in which the beam failure was detected.

Means for receiving (e.g., means for communicating or means for obtaining) may include a receiver and/or antenna(s) 252 of the UE 120a illustrated in FIG. 2 and/or circuitry 1424 for communicating with at least two transmission reception points (TRPs) using beams associated with at least two beam groups, each associate with one of the TRPs. Means for communicating may include a transmitter, a receiver or both. In one example, means for detecting may include and/or circuitry 1426 for detecting a beam failure in a first one of the beam groups.

Means for generating, means for performing, means for determining, means for detecting, means for taking action, means for coordinating may include a processing system, which may include one or more processors, such as the receive processor 258, the transmit processor 264, the TX MIMO processor 266, and/or the controller/processor 280 of the UE 120a illustrated in FIG. 2 and/or the processing system 1402 of the communication device 1400 in FIG. 14.

Figure 15:
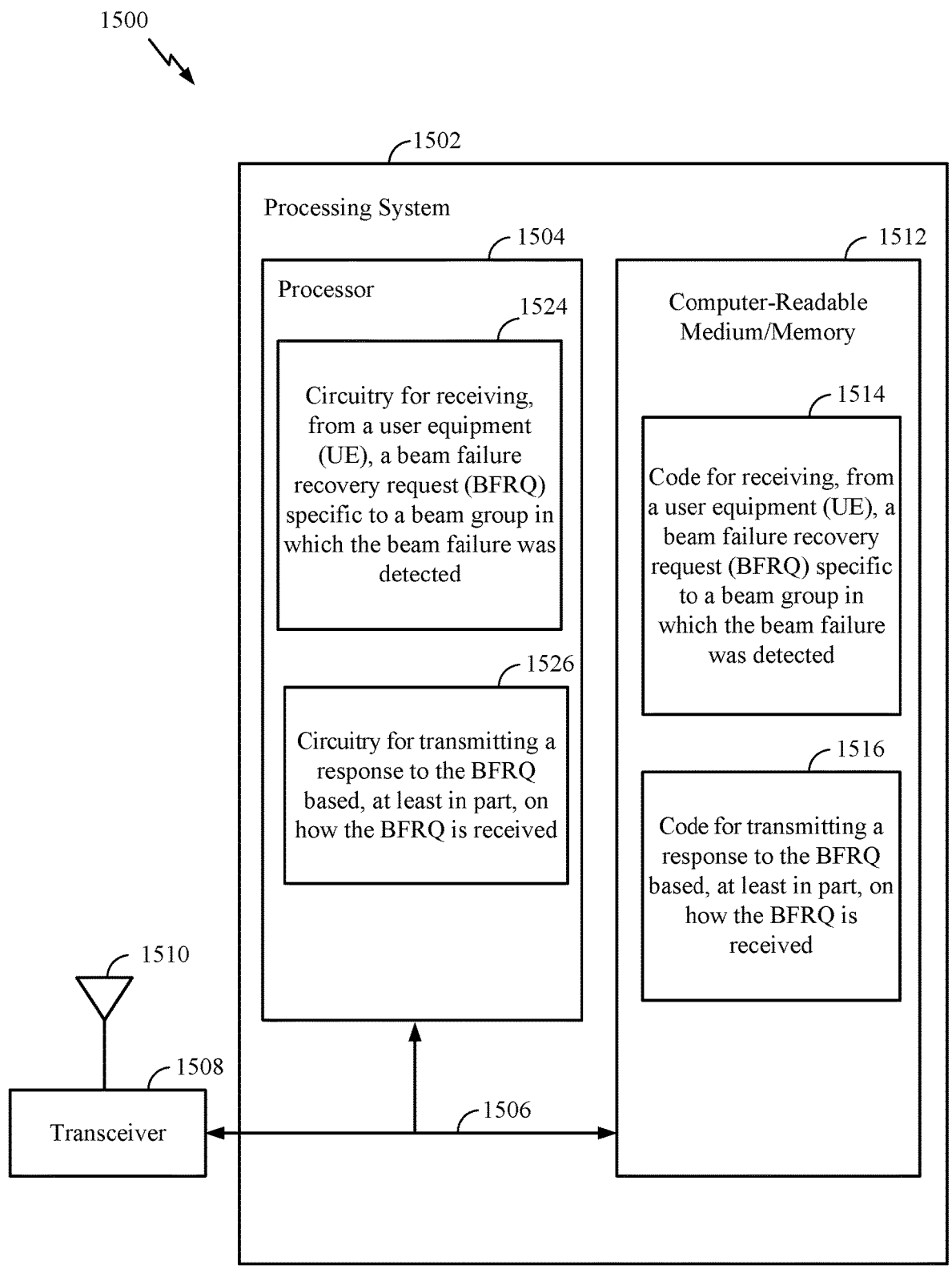
FIG. 15 illustrates a communications device that may include various components configured to perform operations for techniques disclosed herein, according to aspects of the present disclosure.

FIG. 15 illustrates a communications device 1500 that may include various components (e.g., corresponding to means-plus-function components) configured to perform operations for the techniques disclosed herein, such as the operations illustrated in FIG. 13. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 13, or other operations for performing the various techniques discussed herein for configuration of PUCCH BFR for TRP specific BFR. In certain aspects, computer-readable medium/memory 1512 stores code 1514 for receiving, from a user equipment (UE), a beam failure recovery request (BFRQ) specific to a beam group in which the beam failure was detected; and code 1516 for transmitting a response to the BFRQ based, at least in part, on how the BFRQ is received. In certain aspects, the processor 1504 has circuitry configured to implement the code stored in the computer-readable medium/memory 1512. The processor 1504 includes circuitry 1524 for receiving, from a user equipment (UE), a beam failure recovery request (BFRQ) specific to a beam group in which the beam failure was detected; and circuitry 1526 for transmitting a response to the BFRQ based, at least in part, on how the BFRQ is received.

In certain aspects, means for transmitting (e.g., means for communicating or means for outputting for transmission) may include a transmitter and/or an antenna(s) 234 or the BS 110a illustrated in FIG. 2 and/or circuitry 1526 for transmitting a response to the BFRQ based, at least in part, on how the BFRQ is received. Means for receiving (or means for obtaining) may include a receiver and/or an antenna(s)

234 of the BS 110a illustrated in FIG. 2 and/or circuitry 1524 for receiving, from a user equipment (UE), a beam failure recovery request (BFRQ) specific to a beam group in which the beam failure was detected. Means for communicating may include a transmitter, a receiver or both.

Means for generating, means for performing, means for determining, means for taking action, means for coordinating may include a processing system, which may include one or more processors, such as the transmit processor 220, the TX MIMO processor 230, the receive processor 238, and/or the controller/processor 240 of the BS 110a illustrated in FIG. 2 and/or the processing system 1502 of the communication device 1500 in FIG. 15.

Figure 16:
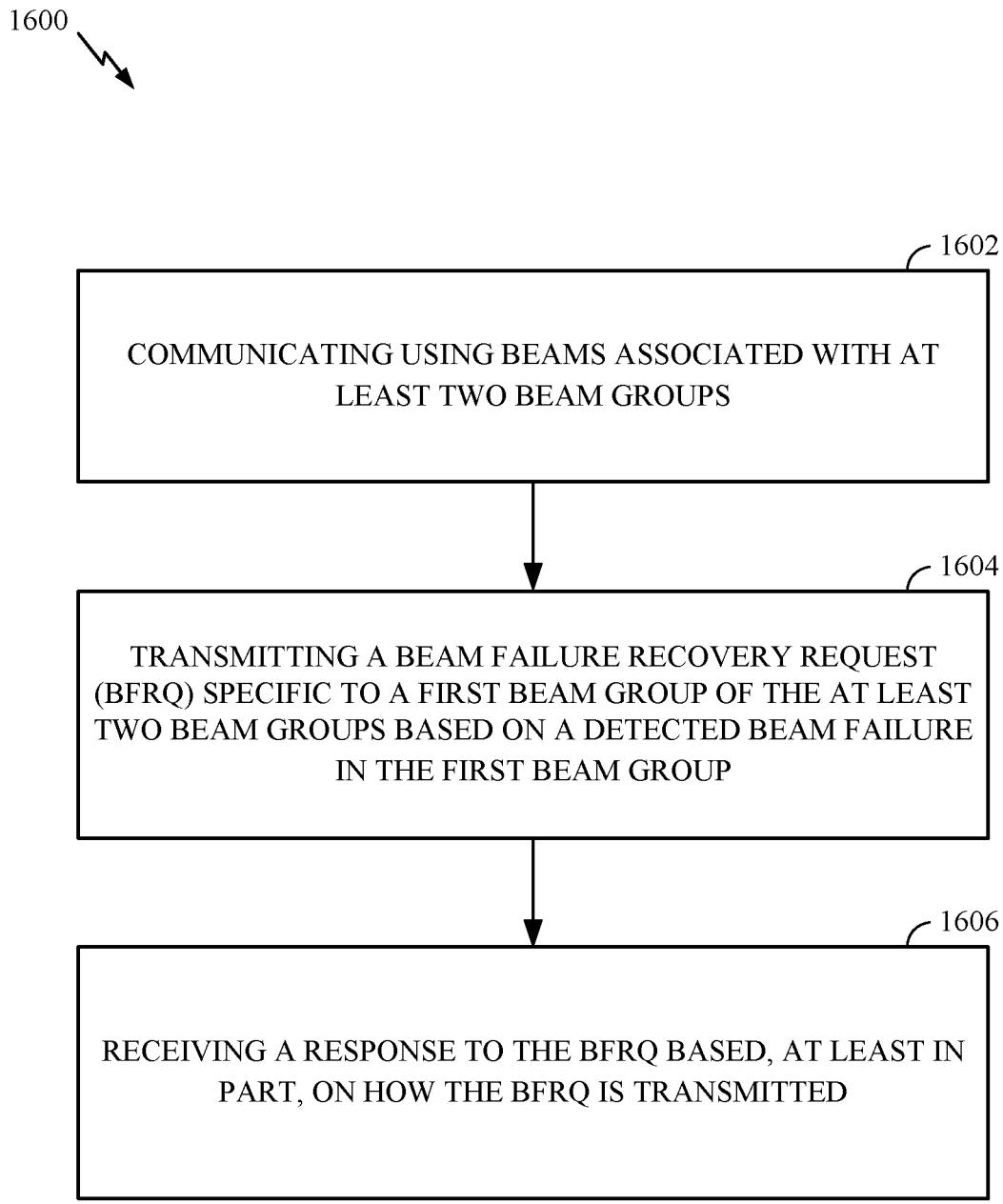
FIG. 16 is a flow diagram illustrating example operations for wireless communication by a UE, according to aspects of the present disclosure.

FIG. 16 is a flow diagram illustrating example operations 1600 for wireless communication, in accordance with certain aspects of the present disclosure. The operations 1600 may be performed, for example, by a UE (e.g., such as the UE 120a in the wireless communication network 100). The operations 1600 may be implemented as software components that are executed and run on one or more processors (e.g., controller/processor 280 of FIG. 2). Further, the transmission and reception of signals by the UE in operations 1600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1600 begin, at a first block 1602, communicating using beams associated with at least two beam groups.

The operations 1600 may proceed, at a second block 1604, by transmitting a beam failure recovery request (BFRQ) specific to a first beam group of the at least two beam groups based on a detected beam failure in the first beam group.

The operations 1600 may proceed, at a third block 1606, by receiving a response to the BFRQ based, at least in part, on how the BFRQ is transmitted.

In certain aspects, based on the BFRQ being transmitted via a beam group specific beam failure recovery (BFR) medium access control (MAC) control element (CE), the response is received via a downlink control information (DCI) scheduling a new physical uplink shared channel (PUSCH) with a same hybrid automatic repeat request (HARM) identification (ID) as a PUSCH carrying the group specific BFR MAC CE.

In certain aspects, the new PUSCH is indicated via a new data indicator (NDI) in the DCI.

In certain aspects, the response to the BFRQ is received via the DCI scheduling the new PUSCH based on the BFRQ being transmitted via the beam group specific BFR MAC CE in a previous PUSCH scheduled or activated by a previous DCI.

In certain aspects, based on the BFRQ being transmitted via a beam group specific beam failure recovery (BFR) medium access control (MAC) control element (CE) that is not scheduled or activated by a downlink control information (DCI), the response is received via: a DCI including a cell radio network temporary identifier (C-RNTI); a DCI including a modulation and coding scheme C-RNTI (MCS-C-RNTI); or a message including a contention resolution ID matching that of the UE.

In certain aspects, based on the BFRQ being transmitted via a preamble in a contention free random access (CFRA) procedure, the response is received via a downlink control information (DCI) in a search space configured for a beam group specific BFRQ.

In certain aspects, based on the BFRQ being transmitted via uplink control information (UCI) carried in a physical uplink control channel (PUCCH) or physical uplink shared channel (PUSCH), the response is received via a downlink acknowledgment (ACK).

In certain aspects, the downlink ACK is received via a standalone or transmission-scheduling downlink control information (DCI).

In certain aspects, the response is received via a downlink control information (DCI), and wherein the DCI is scrambled with a special radio network temporary identifier (RNTI).

In certain aspects, the BFRQ is a beam group specific BFRQ, and wherein the special RNTI is dedicated to the beam group specific BFRQ.

In certain aspects, communicating using beams associated with at least two beam groups further comprises communicating with at least two transmission reception points (TRPs), wherein each of the at least two beam groups are associated with a different one of the at least two TRPs.

Figure 17:
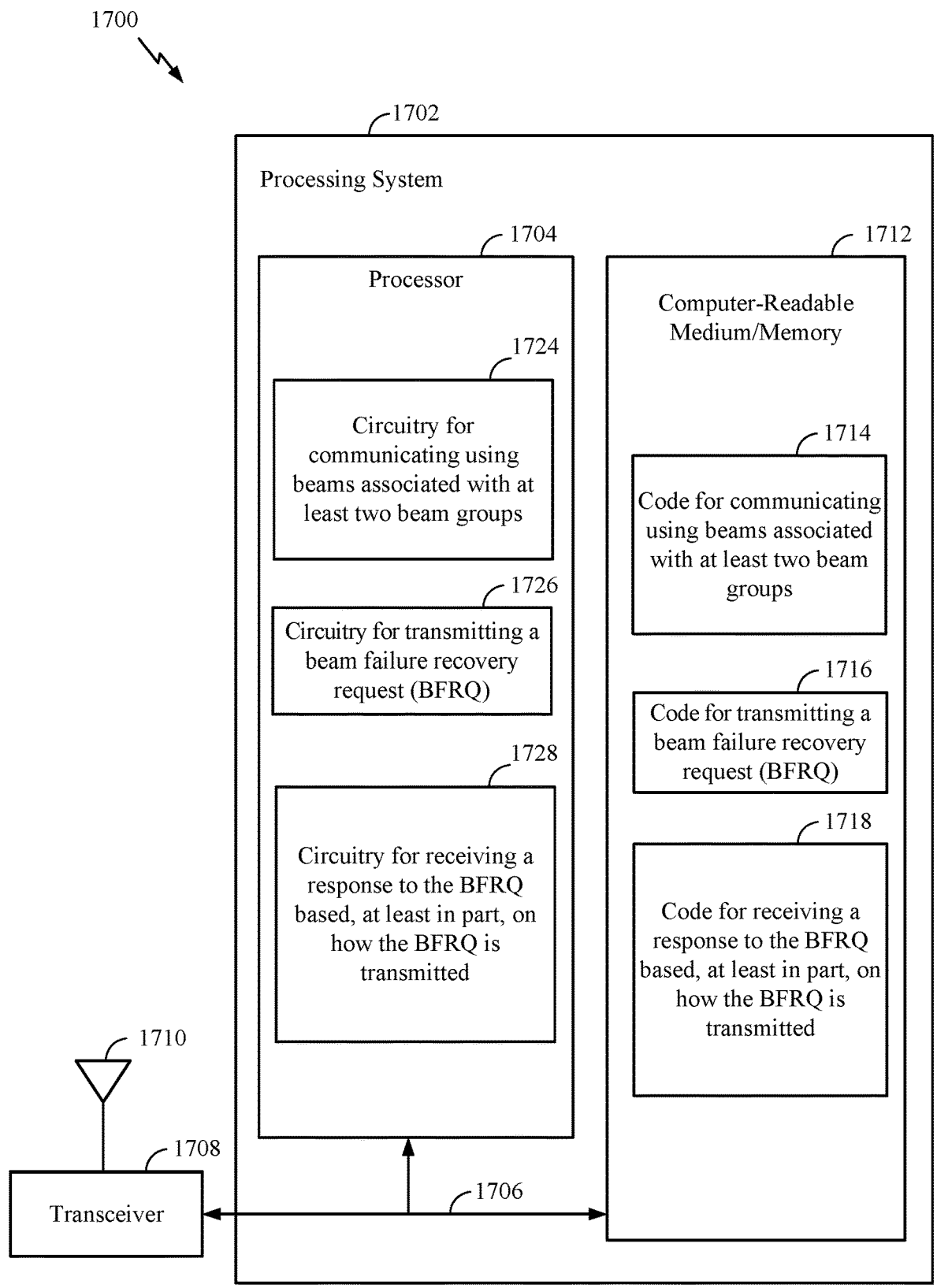
FIG. 17 illustrates a communications device that may include various components configured to perform operations for techniques disclosed herein, according to aspects of the present disclosure.

FIG. 17 illustrates a communications device 1700 that may include various components (e.g., corresponding to means-plus-function components) configured to perform operations for the techniques disclosed herein, such as the operations illustrated in FIG. 16. The communications device 1700 includes a processing system 1702 coupled to a transceiver 1708 (e.g., a transmitter and/or a receiver). The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., computer-executable code) that when executed by the processor 1704, cause the processor 1704 to perform the operations illustrated in FIG. 16, or other operations for performing the various techniques discussed herein for configuration of PUCCH BFR for TRP specific BFR.

In certain aspects, computer-readable medium/memory 1712 stores code 1714 for communicating using beams associated with at least two beam groups. The computer-readable medium/memory 1712 also stores code 1716 for transmitting a beam failure recovery request (BFRQ) specific to a first beam group of the at least two beam groups based on a detected beam failure in the first beam group. The computer-readable medium/memory 1712 also stores code 1718 for sending a response to the BFRQ based, at least in part, on how the BFRQ is received.

In certain aspects, the processor 1704 has circuitry configured to implement the code stored in the computer-readable medium/memory 1712. The processor 1704 includes circuitry 1724 for communicating using beams associated with at least two beam groups. The processor 1704 also includes circuitry 1726 for transmitting a beam failure recovery request (BFRQ) specific to a first beam group of the at least two beam groups based on a detected beam failure in the first beam group. The processor 1704 includes circuitry 1728 for receiving a response to the BFRQ based, at least in part, on how the BFRQ is transmitted.

In certain aspects, means for transmitting (e.g., means for communicating or means for outputting for transmission) may include a transmitter unit 254 and/or antenna(s) 252 of the UE 120*a* illustrated in FIG. 2 and/or circuitry 1724 for communicating using beams associated with at least two beam groups, and circuitry 1726 for transmitting a beam failure recovery request (BFRQ) specific to a first beam group of the at least two beam groups based on a detected beam failure in the first beam group.

Means for receiving (e.g., means for communicating or means for obtaining) may include a receiver and/or antenna(s) 252 of the UE 120*a* illustrated in FIG. 2 and/or circuitry 1724 for communicating using beams associated with at least two beam groups, and circuitry 1726 for transmitting a beam failure recovery request (BFRQ) specific to a first beam group of the at least two beam groups based on a detected beam failure in the first beam group. Means for communicating may include a transmitter, a receiver or both.

Means for generating, means for performing, means for determining, means for taking action, means for coordinating may include a processing system, which may include one or more processors, such as the receive processor 258, the transmit processor 264, the TX MIMO processor 266, and/or the controller/processor 280 of the UE 120*a* illustrated in FIG. 2.

Example Aspects

Implementation examples are described in the following numbered clauses:

1. A method of wireless communication by a user equipment (UE), comprising: communicating using beams associated with at least two beam groups; transmitting a beam failure recovery request (BFRQ) specific to a first beam group of the at least two beam groups based on a detected beam failure in the first beam group; and receiving a response to the BFRQ based, at least in part, on how the BFRQ is transmitted.

2. The method of aspect 1, wherein based on the BFRQ being transmitted via a beam group specific beam failure recovery (BFR) medium access control (MAC) control element (CE), the response is received via a downlink control information (DCI) scheduling a new physical uplink shared channel (PUSCH) with a same hybrid automatic repeat request (HARQ) identification (ID) as a PUSCH carrying the group specific BFR MAC CE.

3. The method of any of aspects 1 and 2, wherein the new PUSCH is indicated via a new data indicator (NDI) in the DCI.

4. The method of any of aspects 1-3, wherein the response to the BFRQ is received via the DCI scheduling the new PUSCH based on the BFRQ being transmitted via the beam group specific BFR MAC CE in a previous PUSCH scheduled or activated by a previous DCI.

5. The method of any of aspects 1-4, wherein based on the BFRQ being transmitted via a beam group specific beam failure recovery (BFR) medium access control (MAC) control element (CE) that is not scheduled or activated by a downlink control information (DCI), the response is received via: a DCI including a cell radio network temporary identifier (C-RNTI); a DCI including a modulation and coding scheme C-RNTI (MCS-C-RNTI); or a message including a contention resolution ID matching that of the UE.

6. The method of any of aspects 1-5, wherein based on the BFRQ being transmitted via a preamble in a contention free random access (CFRA) procedure, the response is received via a downlink control information (DCI) in a search space configured for a beam group specific BFRQ.

7. The method of any of aspects 1-6, wherein based on the BFRQ being transmitted via uplink control information (UCI) carried in a physical uplink control channel (PUCCH) or physical uplink shared channel (PUSCH), the response is received via a downlink acknowledgment (ACK).

8. The method of any of aspects 1-7, wherein the downlink ACK is received via a standalone or transmission-scheduling downlink control information (DCI).

9. The method of any of aspects 1-8, wherein the response is received via a downlink control information (DCI), and wherein the DCI is scrambled with a special radio network temporary identifier (RNTI).

10. The method of any of aspects 1-9, wherein the BFRQ is a beam group specific BFRQ, and wherein the special RNTI is dedicated to the beam group specific BFRQ.

11. The method of any of aspects 1-10, wherein communicating using beams associated with at least two beam groups further comprises communicating with at least two transmission reception points (TRPs), wherein each of the at least two beam groups is associated with a different one of the at least two TRPs.

12. A method of wireless communication by a transmission reception point (TRP), comprising: receiving, from a user equipment (UE), a beam failure recovery request (BFRQ) specific to a beam group in which the beam failure was detected; and transmitting a response to the BFRQ based, at least in part, on how the BFRQ is received.

13. The method of aspect 12, wherein based on the BFRQ being received via a beam group specific beam failure recovery (BFR) medium access control (MAC) control element (CE), the response is transmitted in a downlink control information (DCI) scheduling a new physical uplink shared channel (PUSCH) with a same hybrid automatic repeat request (HARD) ID as a PUSCH carrying the beam group specific BFR MAC CE.

14. The method of any of aspects 12 and 13, wherein the new PUSCH is indicated via a new data indicator (NDI) in the DCI.

15. The method of any of aspects 12-14, wherein the response to the BFRQ is transmitted in the DCI scheduling the new PUSCH based on the BFRQ being transmitted via the beam group specific BFR MAC CE in a previous PUSCH scheduled or activated by a previous DCI.

16. The method of any of aspects 12-15, wherein based on the BFRQ being received via a beam group specific beam failure recovery (BFR) medium access control (MAC) control element (CE) that is not scheduled or activated by a downlink control information (DCI), the response is transmitted via: a DCI including a cell radio network temporary identifier (C-RNTI); a DCI including a modulation and coding scheme C-RNTI (MCS-C-RNTI); or a message including a contention resolution ID matching that of the UE.

17. The method of any of aspects 12-16, wherein based on the BFRQ being received via a preamble in a contention free random access (CFRA) procedure, the response is transmitted in a downlink control information (DCI) search space configured for a beam group specific BFRQ.

18. The method of any of aspects 12-17, wherein based on the BFRQ being received via uplink control information (UCI) carried in a physical uplink control channel (PUCCH) or physical uplink shared channel (PUSCH), the response is transmitted via a downlink acknowledgment (ACK).

19. The method of any of aspects 12-18, wherein the downlink ACK is transmitted via a standalone or transmission-scheduling downlink control information (DCI).

20. The method of any of aspects 12-19, wherein the response to the BFRQ is transmitted via a downlink control information (DCI), and wherein the DCI is scrambled with a special radio network temporary identifier (RNTI).

21. The method of any of aspects 12-20, wherein the BFRQ is a beam group specific BFRQ, and wherein the special RNTI is dedicated to the beam group specific BFRQ.

22. A user equipment (UE) configured for wireless communication, comprising: a memory; and a processor coupled to the memory, the processor and the memory configured to: communicate using beams associated with at least two beam groups; transmit a beam failure recovery request (BFRQ) specific to a first beam group of the at least two beam groups based on a detected beam failure in the first beam group; and receive a response to the BFRQ based, at least in part, on how the BFRQ is transmitted.

23. The UE of aspect 22, wherein based on the BFRQ being transmitted via a beam group specific beam failure recovery (BFR) medium access control (MAC) control element (CE), the processor and the memory are further configured to receive the response via a downlink control information (DCI) scheduling a new physical uplink shared channel (PUSCH) with a same hybrid automatic repeat request (HARQ) identification (ID) as a PUSCH carrying the group specific BFR MAC CE.

24. The UE of any of aspects 22 and 23, wherein the new PUSCH is indicated via a new data indicator (NDI) in the DCI.

25. The UE of any of aspects 22-24, wherein the processor and the memory are further configured to receive the response to the BFRQ via the DCI scheduling the new PUSCH based on the BFRQ being transmitted via the beam group specific BFR MAC CE in a previous PUSCH scheduled or activated by a previous DCI.

26. The UE of any of aspects 22-25, wherein based on the BFRQ being transmitted via a beam group specific beam failure recovery (BFR) medium access control (MAC) control element (CE) that is not scheduled or activated by a downlink control information (DCI), the processor and the memory are further configured to receive the response via: a DCI including a cell radio network temporary identifier (C-RNTI); a DCI including a modulation and coding scheme C-RNTI (MCS-C-RNTI); or a message including a contention resolution ID matching that of the UE.

27. A transmission reception point (TRP) for wireless communication, comprising: a memory; and a processor coupled to the memory, the processor and the memory configured to: receive, from a user equipment (UE), a beam failure recovery request (BFRQ) specific to a beam group in which the beam failure was detected; and transmit a response to the BFRQ based, at least in part, on how the BFRQ is received.

28. The TRP of aspect 27, wherein based on the BFRQ being received via a beam group specific beam failure recovery (BFR) medium access control (MAC) control element (CE), the processor and the memory are further configured to transmit the response in a downlink control information (DCI) scheduling a new physical uplink shared channel (PUSCH) with a same hybrid automatic repeat request (HARM) ID as a PUSCH carrying the beam group specific BFR MAC CE.

29. The TRP of any of aspects 27 and 28, wherein the new PUSCH is indicated via a new data indicator (NDI) in the DCI.

30. The TRP of any of aspects 27-29, wherein the processor and the memory are further configured to transmit the response to the BFRQ in the DCI scheduling the new PUSCH based on the BFRQ being transmitted via the beam group specific BFR MAC CE in a previous PUSCH scheduled or activated by a previous DCI.

31. An apparatus comprising means for performing the method of any of aspects 1 through 11.

32. An apparatus comprising means for performing the method of any of aspects 12 through 21.

33. A computer readable medium storing computer executable code thereon for wireless communications that, when executed by at least one processor, cause an apparatus to perform the method of any of aspects 1 through 11.

34. A computer readable medium storing computer executable code thereon for wireless communications that, when executed by at least one processor, cause an apparatus to perform the method of any of aspects 12 through 21.

35. A method of wireless communication by a user equipment (UE), comprising: communicating with at least two transmission reception points (TRPs) using beams associated with at least two beam groups, each associate with one of the TRPs; detecting a beam failure in a first one of the beam groups; transmitting a beam failure recovery request (BFRQ) specific to a beam group in which the beam failure was detected; and monitoring for a response to the BFRQ based, at least in part, on how the BFRQ is transmitted.

36. The method of aspect 35, wherein, if the BFRQ is sent via a beam group specific BFR medium access control (MAC) control element (CE), the response is sent in a downlink control information (DCI) scheduling a new physical uplink shared channel (PUSCH) with a same hybrid automatic repeat request (HARM) ID as a PUSCH carrying the group specific BFR MAC CE.

37. The method of any of aspects 35 and 36, wherein the new PUSCH is indicated via a toggled new data indicator (NDI) in the DCI.

38. The method of any of aspects 35-37, wherein the response is sent in a DCI scheduling the new PUSCH only if the BFRQ is sent via a beam group specific BFR MAC CE in a PUSCH scheduled or activated by a DCI.

39. The method of any of aspects 35-38, wherein, if the BFRQ is sent via a beam group specific BFR medium access control (MAC) control element (CE) conveyed in a message that is not scheduled or activated by a downlink control information (DCI), the response is sent in a DCI after the message with a C-RNTI or MCS-C-RNTI.

40. The method of any of aspects 35-39, wherein, if the BFRQ is sent via a beam group specific BFR medium access control (MAC) control element (CE) conveyed in a message that is not scheduled or activated by a downlink control information (DCI), the response is sent in a message containing a contention resolution ID matching that of the UE.

41. The method of any of aspects 35-40, wherein, if the BFRQ is sent via a preamble in a contention free random access (CFRA) procedure, the response is sent in a downlink control information (DCI) received in a search space configured to receive the response for a beam group specific BFRQ.

42. The method of any of aspects 35-41, wherein the UE uses a same receive beam for receiving a candidate beam associated with a RACH occasion in which the preamble is sent.

43. The method of any of aspects 35-42, further comprising receiving radio resource control (RRC) signaling configuring at least one of the candidate beam, RACH occasion, or search space for the CFRA based beam group specific BFR.

44. The method of any of aspects 35-43, wherein, if the BFRQ is sent via uplink control information (UCI) carried in a physical uplink control channel (PUCCH) or physical uplink shared channel (PUSCH), the response is conveyed via a downlink acknowledgment.

45. The method of any of aspects 35-44, wherein the downlink acknowledgment is conveyed via a standalone or transmission-scheduling downlink control information (DCI).

46. The method of any of aspects 35-45, wherein the DCI carries a bitmap indicating acknowledgment feedback for each of multiple packets carrying UCI.

47. The method of any of aspects 35-46, wherein the downlink acknowledgment is conveyed via a medium access control (MAC) control element (CE) in a physical downlink shared channel (PDSCH).

48. The method of any of aspects 35-47, wherein the DCI is scrambled with a special radio network temporary identifier (RNTI) dedicated for reception of a response for the beam group specific BFRQ.

49. The method of any of aspects 35-48, wherein the DCI is sent at least one of: by a control resource set (CORESET) with a special ID or group ID; or in a special search space.

50. The method of any of aspects 35-49, further comprising determining when to perform a beam reset after receiving the response to the BFRQ.

51. The method of any of aspects 35-50, wherein the UE performs the beam reset a number of symbols after receiving the response to the BFRQ for one or more channels or reference signals (RSs) associated with the beam group in which the beam failure was detected, if a new candidate beam is identified for that beam group.

52. The method of any of aspects 35-51, wherein the beam reset is applied to a subset of control resource sets (CORESETs) associated with the beam group in which the beam failure was detected.

53. The method of any of aspects 35-52, wherein beams for the one or more channels or RSs are reset to: the new candidate beam, if identified for the beam group in which the beam failure was detected; or a new candidate beam selected by the UE to transmit a preamble in a random access channel (RACH) based beam group specific BFR.

54. The method of any of aspects 35-53, further comprising resetting power control parameters associated with one or more reset beams for uplink transmissions.

55. The method of any of aspects 35-54, further comprising identifying an ID associated with the beam group in which the beam failure was detected.

56. The method of any of aspects 35-55, wherein the ID is: explicitly identified via at least one of a medium access control (MAC) control element (CE) or uplink control information (UCI); implicitly by selection of a candidate beam, RACH occasion, or search space for receiving the BFRQ response; or via association with a control resource set (CORESET).

57. The method of any of aspects 35-56, wherein the UE applies the beam reset to one or more active bandwidth parts (BWPs) of one or more component carriers (CCs).

58. The method of any of aspects 35-57, wherein the UE applies the beam reset to certain types of channels, certain types or reference signals, or certain resource IDs.

59. A method of wireless communication by a user equipment (UE), comprising: receiving, from a user equipment (UE), a beam failure recovery request (BFRQ) specific to a beam group in which the beam failure was detected; and sending a response to the BFRQ based, at least in part, on how the BFRQ is received.

60. The method of aspect 59, wherein, if the BFRQ is received via a beam group specific BFR medium access control (MAC) control element (CE), the response is sent in a downlink control information (DCI) scheduling a new physical uplink shared channel (PUSCH) with a same hybrid automatic repeat request (HARM) ID as a PUSCH carrying the group specific BFR MAC CE.

61. The method of any of aspects 59 and 60, wherein the new PUSCH is indicated via a toggled new data indicator (NDI) in the DCI.

62. The method of any of aspects 59-61, wherein the response is sent in a DCI scheduling the new PUSCH only if the BFRQ is sent via a beam group specific BFR MAC CE in a PUSCH scheduled or activated by a DCI.

63. The method of any of aspects 59-62, wherein, if the BFRQ is sent via a beam group specific BFR medium access control (MAC) control element (CE) conveyed in a message that is not scheduled or activated by a downlink control information (DCI), the response is sent in a DCI after the message with a C-RNTI or MCS-C-RNTI.

64. The method of any of aspects 59-63, wherein, if the BFRQ is sent via a beam group specific BFR medium access control (MAC) control element (CE) conveyed in a message that is not scheduled or activated by a downlink control information (DCI), the response is sent in a message containing a contention resolution ID matching that of the UE.

65. The method of any of aspects 59-64, wherein, if the BFRQ is received via a preamble in a contention free random access (CFRA) procedure, the response is sent in a downlink control information (DCI) received in a search space configured to receive the response for a beam group specific BFRQ.

66. The method of any of aspects 59-65, wherein the UE uses a same receive beam for receiving a candidate beam associated with a RACH occasion in which the preamble is sent.

67. The method of any of aspects 59-66, further comprising sending the UE radio resource control (RRC) signaling configuring at least one of the candidate beam, RACH occasion, or search space for the CFRA based beam group specific BFR.

68. The method of any of aspects 59-67, wherein, if the BFRQ is received via uplink control information (UCI) carried in a physical uplink control channel (PUCCH) or physical uplink shared channel (PUSCH), the response is conveyed via a downlink acknowledgment.

69. The method of any of aspects 59-68, wherein the downlink acknowledgment is conveyed via a standalone or transmission-scheduling downlink control information (DCI).

70. The method of any of aspects 59-69, wherein the DCI carries a bitmap indicating acknowledgment feedback for each of multiple packets carrying UCI.

71. The method of any of aspects 59-70, wherein the downlink acknowledgment is conveyed via a medium access control (MAC) control element (CE) in a physical downlink shared channel (PDSCH).

72. The method of any of aspects 59-71, wherein the DCI is scrambled with a special radio network temporary identifier (RNTI) dedicated for reception of a response for the beam group specific BFRQ.

73. The method of any of aspects 59-72, wherein the DCI is sent at least one of: by a control resource set (CORESET) with a special ID or group ID; or in a special search space.

74. The method of any of aspects 59-73, further comprising determining when to perform a beam reset after sending the response to the BFRQ.

75. The method of any of aspects 59-74, wherein the network entity performs the beam reset a number of symbols after sending the response to the BFRQ for one or more channels or reference signals (RSs) associated with the beam group in which the beam failure was detected, if a new candidate beam is identified for that beam group.

76. The method of any of aspects 59-75, wherein the beam reset is applied to a subset of control resource sets (CORESETs) associated with the beam group in which the beam failure was detected.

77. The method of any of aspects 59-76, wherein beams for the one or more channels or RSs are reset to: the new candidate beam, if identified for the beam group in which the beam failure was detected; or a new candidate beam selected by the UE to transmit a preamble in a random access channel (RACH) based beam group specific BFR.

78. The method of any of aspects 59-77, further comprising identifying an ID associated with the beam group in which the beam failure was detected.

79. The method of any of aspects 59-78, wherein the ID is: explicitly identified via at least one of a medium access control (MAC) control element (CE) or uplink control information (UCI); implicitly by selection of a candidate beam, RACH occasion, or search space for receiving the BFRQ response; or via association with a control resource set (CORESET).

80. The method of any of aspects 59-79, wherein the network entity applies the beam reset to one or more active bandwidth parts (BWPs) of one or more component carriers (CCs).

81. The method of any of aspects 59-80, wherein the network entity applies the beam reset to certain types of channels, certain types or reference signals, or certain resource IDs.

82. An apparatus comprising means for performing the method of any of aspects 35 through 58.

83. An apparatus comprising means for performing the method of any of aspects 59 through 81.

84. An apparatus comprising at least one processor and a memory coupled to the at least one processor, the memory comprising code executable by the at least one processor to cause the apparatus to perform the method of any of aspects 35 through 58.

85. An apparatus comprising at least one processor and a memory coupled to the at least one processor, the memory comprising code executable by the at least one processor to cause the apparatus to perform the method of any of aspects 59 through 81.

86. A computer readable medium storing computer executable code thereon for wireless communications that, when executed by at least one processor, cause an apparatus to perform the method of any of aspects 35 through 58.

87. A computer readable medium storing computer executable code thereon for wireless communications that, when executed by at least one processor, cause an apparatus to perform the method of any of aspects 59 through 81.

Additional Considerations

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 12 and/or FIG. 13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a user equipment (UE), comprising:
communicating using beams associated with at least two beam groups;
transmitting a beam failure recovery request (BFRQ) specific to a first beam group of the at least two beam groups based on a detected beam failure in the first beam group via a beam group specific beam failure recovery (BFR) medium access control (MAC) control element (CE) or a preamble in a contention free random access (CFRA) procedure; and
receiving a response to the BFRQ based, at least in part, on how the BFRQ is transmitted, wherein the response comprises a first response comprising a contention resolution identification (ID) matching that of the UE when the BFRQ is transmitted via the beam group specific BFR MAC CE and the response comprises a second response when the BFRQ is transmitted via the preamble in the CFRA procedure.

2. The method of claim 1, wherein based on the BFRQ being transmitted via the beam group specific BFR MAC CE, the response is received via a downlink control information (DCI) scheduling a new physical uplink shared channel (PUSCH) with a same hybrid automatic repeat request (HARQ) identification (ID) as a PUSCH carrying the beam group specific BFR MAC CE.

3. The method of claim 2, wherein the new PUSCH is indicated via a new data indicator (NDI) in the DCI.

4. The method of claim 2, wherein the response to the BFRQ is received via the DCI scheduling the new PUSCH based on the BFRQ being transmitted via the beam group specific BFR MAC CE in a previous PUSCH scheduled or activated by a previous DCI.

5. The method of claim 1, wherein based on the BFRQ being transmitted via the beam group specific BFR MAC CE that is not scheduled or activated by a downlink control information (DCI), the response is received via:
a DCI including a cell radio network temporary identifier (C-RNTI); or
a DCI including a modulation and coding scheme C-RNTI (MCS-C-RNTI).

6. The method of claim 1, wherein based on the BFRQ being transmitted via the preamble in the CFRA procedure, the response is received via a downlink control information (DCI) in a search space configured for a beam group specific BFRQ.

7. The method of claim 1, wherein based on the BFRQ being transmitted via uplink control information (UCI) carried in a physical uplink control channel (PUCCH) or physical uplink shared channel (PUSCH), the response is received via a downlink acknowledgment (ACK).

8. The method of claim 7, wherein the downlink ACK is received via a standalone or transmission-scheduling downlink control information (DCI).

9. The method of claim 1, wherein the response is received via a downlink control information (DCI), and wherein the DCI is scrambled with a special radio network temporary identifier (RNTI).

10. The method of claim 9, wherein the BFRQ is a beam group specific BFRQ, and wherein the special RNTI is dedicated to the beam group specific BFRQ.

11. The method of claim 1, wherein communicating using beams associated with at least two beam groups further comprises communicating with at least two transmission reception points (TRPs), wherein each of the at least two beam groups are associated with a different one of the at least two TRPs.

12. A method of wireless communication by a transmission reception point (TRP), comprising:

receiving, from a user equipment (UE), a beam failure recovery request (BFRQ) specific to a beam group in which the beam failure was detected via a beam group specific beam failure recovery (BFR) medium access control (MAC) control element (CE) or a preamble in a contention free random access (CFRA) procedure; and transmitting a response to the BFRQ based, at least in part, on how the BFRQ is received, wherein the response comprises a first response comprising a contention resolution identification (ID) matching that of the UE when the BFRQ is transmitted via the beam group specific BFR MAC CE and the response comprises a second response when the BFRQ is transmitted via the preamble in the CFRA procedure.

13. The method of claim 12, wherein based on the BFRQ being received via the beam group specific BFR MAC CE, the response is transmitted in a downlink control information (DCI) scheduling a new physical uplink shared channel (PUSCH) with a same hybrid automatic repeat request (HARQ) ID as a PUSCH carrying the beam group specific BFR MAC CE.

14. The method of claim 13, wherein the new PUSCH is indicated via a new data indicator (NDI) in the DCI.

15. The method of claim 13, wherein the response to the BFRQ is transmitted in the DCI scheduling the new PUSCH based on the BFRQ being transmitted via the beam group specific BFR MAC CE in a previous PUSCH scheduled or activated by a previous DCI.

16. The method of claim 12, wherein based on the BFRQ being received via the beam group specific BFR MAC CE that is not scheduled or activated by a downlink control information (DCI), the response is transmitted via:
- a DCI including a cell radio network temporary identifier (C-RNTI); or
- a DCI including a modulation and coding scheme C-RNTI (MCS-C-RNTI).

17. The method of claim 12, wherein based on the BFRQ being received via the preamble in the CFRA procedure, the response is transmitted in a downlink control information (DCI) search space configured for a beam group specific BFRQ.

18. The method of claim 12, wherein based on the BFRQ being received via uplink control information (UCI) carried in a physical uplink control channel (PUCCH) or physical uplink shared channel (PUSCH), the response is transmitted via a downlink acknowledgment (ACK).

19. The method of claim 18, wherein the downlink ACK is transmitted via a standalone or transmission-scheduling downlink control information (DCI).

20. The method of claim 12, wherein the response to the BFRQ is transmitted via a downlink control information (DCI), and wherein the DCI is scrambled with a special radio network temporary identifier (RNTI).

21. The method of claim 20, wherein the BFRQ is a beam group specific BFRQ, and wherein the special RNTI is dedicated to the beam group specific BFRQ.

22. A user equipment (UE) configured for wireless communication, comprising:
a memory comprising instructions; and
one or more processors configured, individually or in any combination, to execute the instructions and cause the UE to:
- communicate using beams associated with at least two beam groups;
- transmit a beam failure recovery request (BFRQ) specific to a first beam group of the at least two beam groups based on a detected beam failure in the first beam group via a beam group specific beam failure recovery (BFR) medium access control (MAC) control element (CE) or a preamble in a contention free random access (CFRA) procedure; and
- receive a response to the BFRQ based, at least in part, on how the BFRQ is transmitted, wherein the response comprises a first response comprising a contention resolution identification (ID) matching that of the UE when the BFRQ is transmitted via the beam group specific BFR MAC CE and the response comprises a second response when the BFRQ is transmitted via the preamble in the CFRA procedure.

23. The UE of claim 22, wherein based on the BFRQ being transmitted via the beam group specific BFR MAC CE, the one or more processors are configured, individually or in any combination, to execute the instructions and cause the UE to receive the response via a downlink control information (DCI) scheduling a new physical uplink shared channel (PUSCH) with a same hybrid automatic repeat request (HARQ) identification (ID) as a PUSCH carrying the beam group specific BFR MAC CE.

24. The UE of claim 23, wherein the new PUSCH is indicated via a new data indicator (NDI) in the DCI.

25. The UE of claim 23, wherein the one or more processors are configured, individually or in any combination, to execute the instructions and cause the UE to receive the response to the BFRQ via the DCI scheduling the new PUSCH based on the BFRQ being transmitted via the beam group specific BFR MAC CE in a previous PUSCH scheduled or activated by a previous DCI.

26. The UE of claim 22, wherein based on the BFRQ being transmitted via the beam group specific BFR MAC CE that is not scheduled or activated by a downlink control information (DCI), the one or more processors are configured, individually or in any combination, to execute the instructions and cause the UE to receive the response via:
- a DCI including a cell radio network temporary identifier (C-RNTI); or
- a DCI including a modulation and coding scheme C-RNTI (MCS-C-RNTI).

27. A transmission reception point (TRP) for wireless communication, comprising:
a memory comprising instructions; and
one or more processors configured, individually or in any combination, to execute the instructions and cause the TRP to:
- receive, from a user equipment (UE), a beam failure recovery request (BFRQ) specific to a beam group in which the beam failure was detected via a beam group specific beam failure recovery (BFR) medium access control (MAC) control element (CE) or a preamble in a contention free random access (CFRA) procedure; and
- transmit a response to the BFRQ based, at least in part, on how the BFRQ is received, wherein the response comprises a first response comprising a contention resolution identification (ID) matching that of the UE when the BFRQ is transmitted via the beam group specific BFR MAC CE and the response comprises a second response when the BFRQ is transmitted via the preamble in the CFRA procedure.

28. The TRP of claim 27, wherein based on the BFRQ being received via the beam group specific BFR MAC CE, the one or more processors are configured, individually or in any combination, to execute the instructions and cause the TRP to transmit the response in a downlink control information (DCI) scheduling a new physical uplink shared channel (PUSCH) with a same hybrid automatic repeat request (HARQ) ID as a PUSCH carrying the beam group specific BFR MAC CE.

29. The TRP of claim 28, wherein the new PUSCH is indicated via a new data indicator (NDI) in the DCI.

30. The TRP of claim 28, wherein the one or more processors are configured, individually or in any combination, to execute the instructions and cause the TRP to transmit the response to the BFRQ in the DCI scheduling the new PUSCH based on the BFRQ being transmitted via the beam group specific BFR MAC CE in a previous PUSCH scheduled or activated by a previous DCI.

* * * * *